(12) United States Patent
Zemach et al.

(10) Patent No.: US 10,200,313 B2
(45) Date of Patent: Feb. 5, 2019

(54) PACKET DESCRIPTOR STORAGE IN PACKET MEMORY WITH CACHE

(71) Applicant: Marvell Israel (M.I.S.L) Ltd., Yokneam (IL)

(72) Inventors: Rami Zemach, Givat Shapira (IL); Dror Bromberg, Michmoret (IL)

(73) Assignee: Marvell Israel (M.I.S.L) Ltd., Yokneam (IL)

( * ) Notice: Subject to any disclaimer, the term of this patent is extended or adjusted under 35 U.S.C. 154(b) by 56 days.

(21) Appl. No.: 15/610,909

(22) Filed: Jun. 1, 2017

(65) Prior Publication Data

US 2017/0353403 A1 Dec. 7, 2017

Related U.S. Application Data

(60) Provisional application No. 62/344,604, filed on Jun. 2, 2016.

(51) Int. Cl.
| | |
|---|---|
| *G06F 3/06* | (2006.01) |
| *H04L 12/861* | (2013.01) |
| *H04L 12/863* | (2013.01) |
| *H04L 12/879* | (2013.01) |
| *H04L 12/883* | (2013.01) |
| *H04L 12/933* | (2013.01) |

(52) U.S. Cl.
CPC ........ *H04L 49/9015* (2013.01); *G06F 3/0659* (2013.01); *H04L 47/6245* (2013.01); *H04L 49/103* (2013.01); *H04L 49/9005* (2013.01); *H04L 49/9026* (2013.01); *H04L 49/9042* (2013.01); *H04L 49/9078* (2013.01)

(58) Field of Classification Search
CPC .............. H04L 49/9015; H04L 49/103; H04L 49/9005; H04L 49/9026; H04L 49/9042; G06F 3/0659
See application file for complete search history.

(56) References Cited

U.S. PATENT DOCUMENTS

| | | |
|---|---|---|
| 7,089,326 B2 | 8/2006 | Boucher et al. |
| 8,578,380 B1 | 11/2013 | Adams et al. |
| 9,112,708 B1 | 8/2015 | Arad et al. |
| 9,306,876 B1 | 4/2016 | Ulman et al. |

(Continued)

OTHER PUBLICATIONS

International Search Report and Written Opinion in International Patent Application No. PCT/IB2017/053223, dated Sep. 13, 2017 (16 pages).

*Primary Examiner* — Kevin C. Harper

(57) ABSTRACT

A first memory device stores (i) a head part of a FIFO queue structured as a linked list (LL) of LL elements arranged in an order in which the LL elements were added to the FIFO queue and (ii) a tail part of the FIFO queue. A second memory device stores a middle part of the FIFO queue, the middle part comprising a LL elements following, in an order, the head part and preceding, in the order, the tail part. A queue controller retrieves LL elements in the head part from the first memory device, moves LL elements in the middle part from the second memory device to the head part in the first memory device prior to the head part becoming empty, and updates LL parameters corresponding to the moved LL elements to indicate storage of the moved LL elements changing from the second memory device to the first memory device.

23 Claims, 7 Drawing Sheets

(56) References Cited

U.S. PATENT DOCUMENTS

| | | | |
|---|---|---|---|
| 2005/0259672 A1* | 11/2005 | Eduri | G06F 13/385 370/412 |
| 2007/0223482 A1* | 9/2007 | Wyatt | H04L 49/103 370/392 |
| 2014/0169378 A1 | 6/2014 | Shumsky et al. | |
| 2014/0307740 A1 | 10/2014 | Li et al. | |
| 2015/0215226 A1 | 7/2015 | Peled et al. | |

* cited by examiner

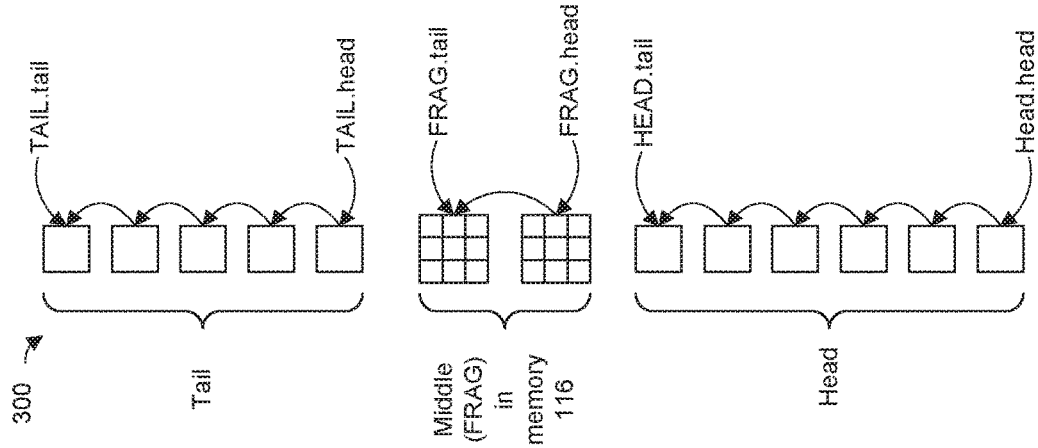
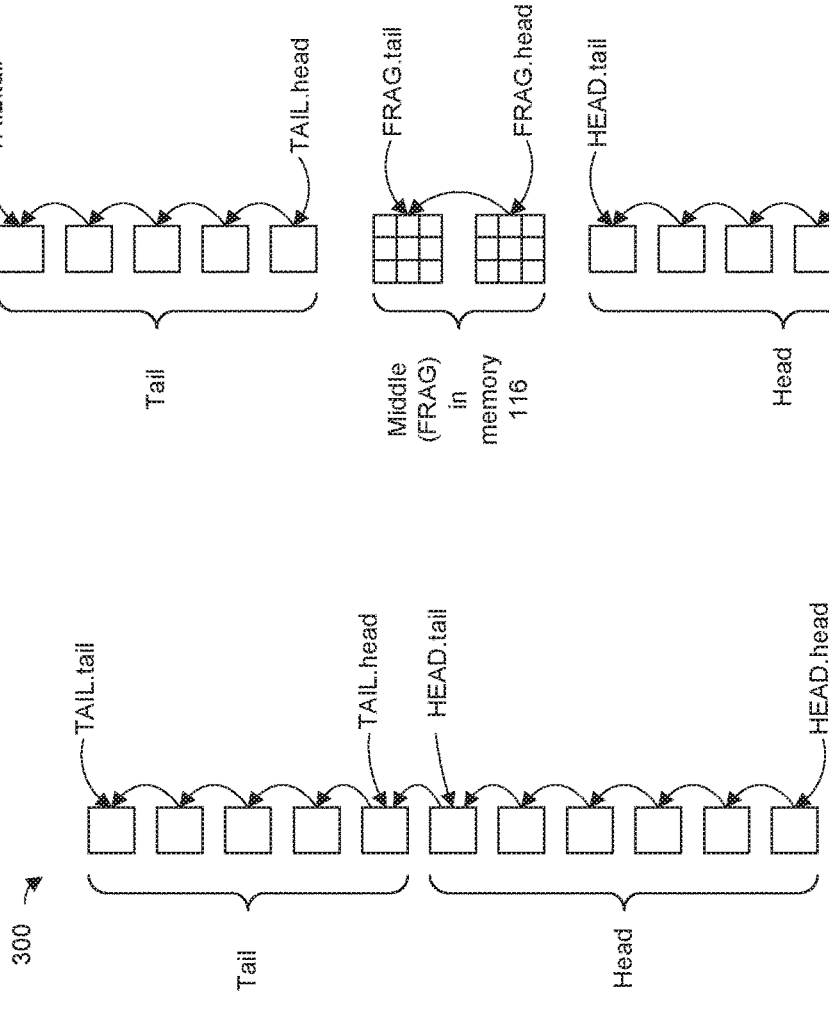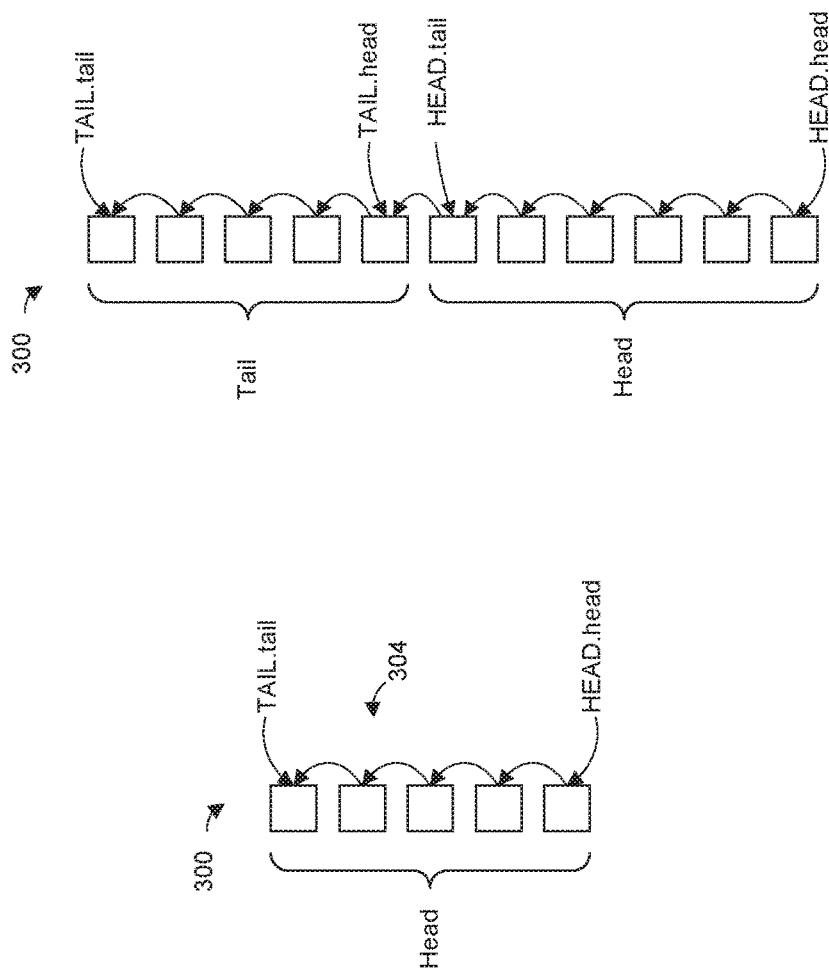

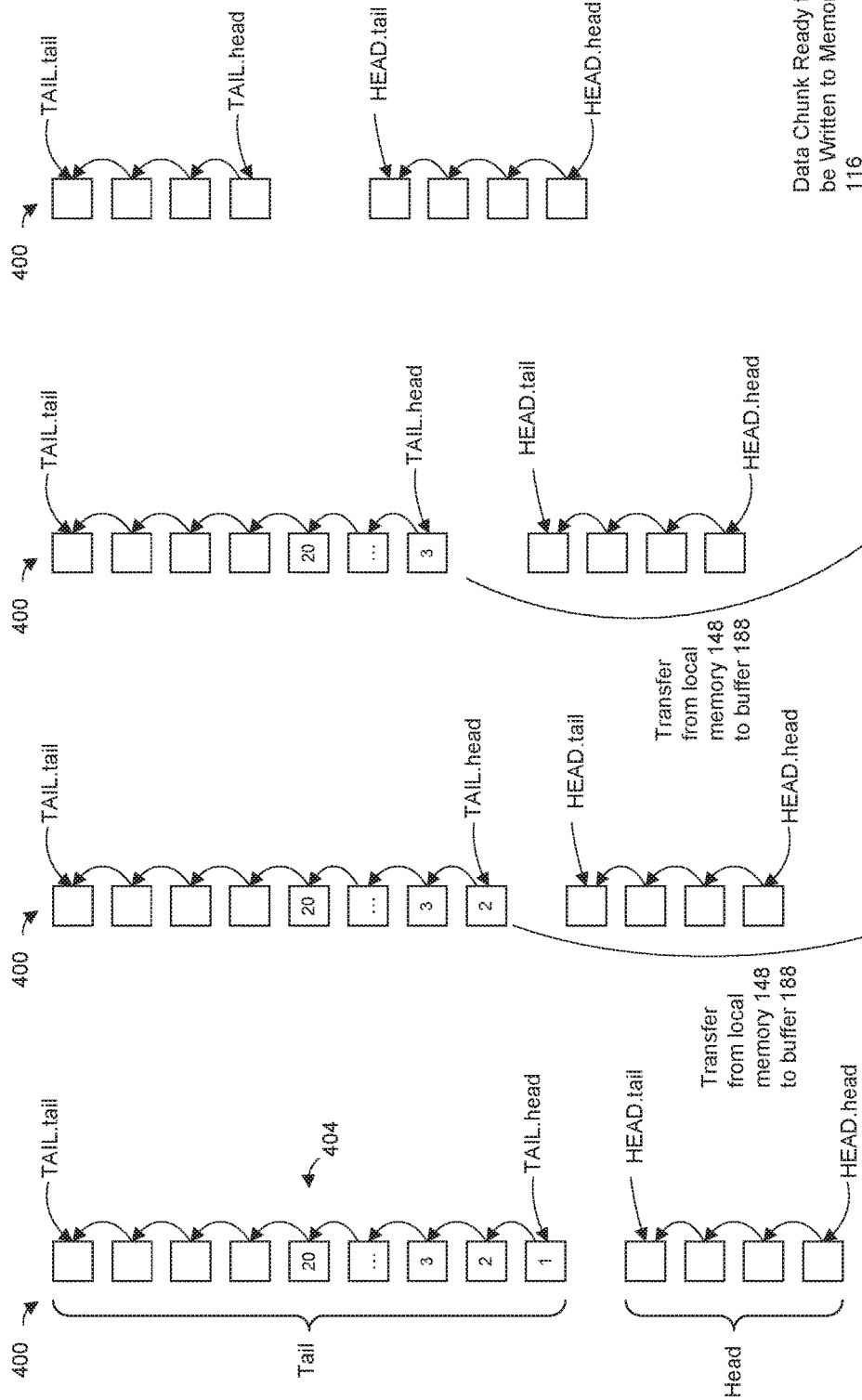

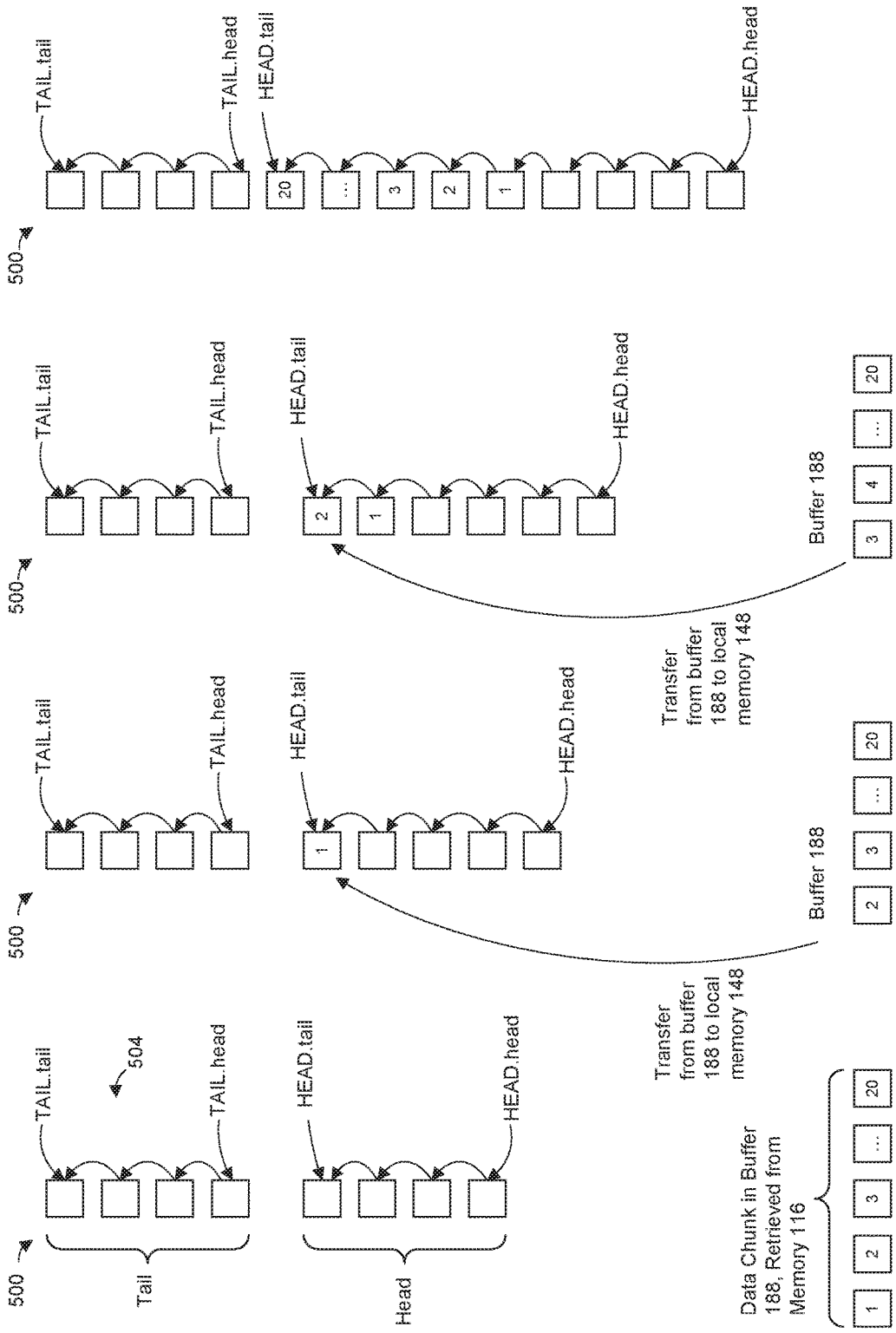

PACKET DESCRIPTOR STORAGE IN PACKET MEMORY WITH CACHE

CROSS REFERENCES TO RELATED APPLICATIONS

This application claims the benefit of U.S. Provisional Patent Application No. 62/344,604, entitled "Packet Descriptor Linked List Cache," filed on Jun. 2, 2016, the disclosure of which is expressly incorporated herein by reference in its entirety.

FIELD OF TECHNOLOGY

The present disclosure relates generally to network devices in communication networks, and more particularly to memory systems of network devices.

BACKGROUND

Network devices, such as bridges, routers, etc., forward packets through a network based on addresses, and/or other information, in the packets. A network device typically includes a plurality of ports coupled to different network links. The network device may receive a packet via one port and process address information (and/or other information) in a header of the packet to decide via which other port or ports the network switch should transmit the packet. The network device then forwards the packet to the determined one or more other ports.

Upon receiving a packet, a network device stores the packet in a packet memory (sometimes referred to as a "packet buffer"). The network device also generates a packet descriptor that includes information about the packet, such as information from a header of the packet and a location of the packet in the packet memory. The packet descriptor is typically much smaller than the packet itself. For example, packets are frequently more than 1000 bytes in length, whereas a packet descriptor is typically less than 10 bytes in length.

The packet descriptor is processed at least to determine the port or ports to which to forward the packet, and the packet descriptor is then enqueued in one or more transmit queues corresponding to the determined port or ports. When the packet descriptor reaches a head of a transmit queue, the corresponding packet is retrieved from the packet memory for forwarding to the determined port or ports.

As compared to memory used for storing packet descriptors (such as the transmit queues), the packet memory is typically much larger and is organized and/or configured for handling much larger chunks of data. For instance, the packet memory is designed for storing packets that are frequently greater than 1000 bytes in length, whereas the transmit queues are designed for storing packet descriptors that are less than 10 bytes, for example, in length.

SUMMARY

In an embodiment, an apparatus comprises: a first memory device configured to store: (i) a head part of a first-in-first-out (FIFO) queue, the FIFO queue structured as a linked list (LL) of LL elements arranged in an order in which the LL elements were added to the FIFO queue, the head part including a first plurality of LL elements arranged for retrieval from the FIFO queue in the order in which the LL elements were added to the FIFO queue, and (ii) a tail part of the FIFO queue, the tail part comprising a second plurality of LL elements arranged corresponding to an order in which the second plurality LL elements were added to the FIFO queue. The apparatus also comprises a second memory device that is separate from the first memory, the second memory configured to store a middle part of the FIFO queue, the middle part comprising a third plurality of LL elements following, in the order, the head part and preceding, in the order, the tail part. The apparatus further comprises a queue controller configured to: retrieve LL elements in the head part from the first memory device according to the order, move LL elements in the middle part from the second memory device to the head part in the first memory device prior to the head part becoming empty, and update LL parameters corresponding to the moved LL elements to indicate storage of the moved LL elements changing from the second memory device to the first memory device.

In another embodiment, a method includes storing in a first memory device: (i) a head part of a first-in-first-out (FIFO) queue, the FIFO queue structured as a linked list (LL) of LL elements arranged in an order in which the LL elements were added to the FIFO queue, the head part including a first plurality of LL elements arranged for retrieval from the FIFO queue in the order in which the LL elements were added to the FIFO queue, and (ii) a tail part of the FIFO queue, the tail part comprising a second plurality of LL elements arranged corresponding to an order in which the second plurality LL elements were added to the FIFO queue. The method also includes: storing, in a second memory device that is separate from the first memory, a middle part of the FIFO queue, the middle part comprising a third plurality of LL elements following, in the order, the head part and preceding, in the order, the tail part; and retrieving, from the first memory device, LL elements in the head part according to the order; moving, with a queue controller, LL elements in the middle part from the second memory device to the head part in the first memory device prior to the head part becoming empty; and updating, with the queue controller, LL parameters corresponding to the moved LL elements to indicate storage of the moved LL elements changing from the second memory device to the first memory device.

In yet another embodiment, an apparatus comprises: a plurality of network interfaces configured to couple to a plurality of network links; and a packet processor configured to process packets received via the plurality of network interfaces and to determine network interfaces to which received packets are to be forwarded. The apparatus also comprises a first memory device configured to store: (i) a head part of a first-in-first-out (FIFO) transmit queue corresponding to at least one of the network interfaces, the FIFO transmit queue for storing packet descriptors corresponding to packets to be transmitted via the at least one network interface, the FIFO transmit queue structured as a linked list (LL) of LL elements arranged in an order in which the LL elements were added to the FIFO queue, the head part including a first plurality of LL elements arranged for retrieval from the FIFO queue in the order in which the LL elements were added to the FIFO queue, and (ii) a tail part of the FIFO queue, the tail part comprising a second plurality of LL elements arranged corresponding to an order in which the second plurality LL elements were added to the FIFO queue. The apparatus further comprises: a second memory device that is separate from the first memory, the second memory configured to store a middle part of the FIFO queue, the middle part comprising a third plurality of LL elements following, in the order, the head part and preceding, in the order, the tail part; and a queue controller configured to: store new LL elements in the tail part to the first memory device according to the order in connection with new packet descriptors being added to the transmit queue, retrieve LL elements in the head part from the first memory device according to the order in connection with transmission, via the at least one network interface, of packets corresponding to packet descriptors in the transmit queue, move LL elements in the middle part from the second memory device to the head part in the first memory device prior to the head part becoming empty, and update LL parameters corresponding to the moved LL elements to indicate storage of the moved LL elements changing from the second memory device to the first memory device.

In still another embodiment, a method includes receiving packets via a plurality of network interfaces of a network device; determining, at the network device, network interfaces to which received packets are to be forwarded; and storing in a first memory device: (i) a head part of a first-in-first-out (FIFO) transmit queue corresponding to at least one of the network interfaces, the FIFO transmit queue for storing packet descriptors corresponding to packets to be transmitted via the at least one network interface, the FIFO transmit queue structured as a linked list (LL) of LL elements arranged in an order in which the LL elements were added to the FIFO queue, the head part including a first plurality of LL elements arranged for retrieval from the FIFO queue in the order in which the LL elements were added to the FIFO queue, and (ii) a tail part of the FIFO queue, the tail part comprising a second plurality of LL elements arranged corresponding to an order in which the second plurality LL elements were added to the FIFO queue. The method further includes: storing, in a second memory device that is separate from the first memory, a middle part of the FIFO queue, the middle part comprising a third plurality of LL elements following, in the order, the head part and preceding, in the order, the tail part; retrieving, from the first memory device, LL elements in the head part according to the order in connection with transmission, via the at least one network interface, of packets corresponding to packet descriptors in the transmit queue; moving, with a queue controller, LL elements in the middle part from the second memory device to the head part in the first memory device prior to the head part becoming empty; and updating, with the queue controller, LL parameters corresponding to the moved LL elements to indicate storage of the moved LL elements changing from the second memory device to the first memory device.

BRIEF DESCRIPTION OF THE DRAWINGS

FIGS. 3A-C are diagrams of an example linked list, e.g., of packet descriptors, that is stored in different memories when the linked list grows, according to an embodiment.

FIGS. 4A-D are diagrams of a procedure for moving elements of a linked list stored in a first memory to a second memory, according to an embodiment.

FIGS. 5A-D are diagrams of a procedure for moving elements of a linked list stored in the second memory back to the first memory, according to an embodiment.

DETAILED DESCRIPTION

In embodiments described below, a packet memory that stores packet data (e.g., payloads of packets) while packets are being processed is also used for storing queues of packet descriptors that have been processed by a network device. Using the packet memory for packet descriptor storage improves scalability of a network device architecture, at least in some embodiments. To account for increased latency resulting from use of the packet memory, an additional memory (e.g., a cache memory) is used in conjunction with storage of packet descriptors in the packet memory, according to some embodiments.

In other embodiments described below, a linked list of data elements (e.g., packet descriptors) is stored in multiple memories. For example, data elements at a head and a tail of the linked list are stored in a first memory, whereas data elements located in between the head and the tail are stored in a second memory different than the first memory, according to an embodiment. Maintaining the linked list that crosses a boundary between the first memory and the second memory permits the use of a smaller first memory, while at the same time permits use of a second memory that is cheaper (in terms of per storage unit cost) than the first memory but possibly slower and/or having a greater latency, thus reducing overall cost, at least in some embodiments.

Figure 1A:
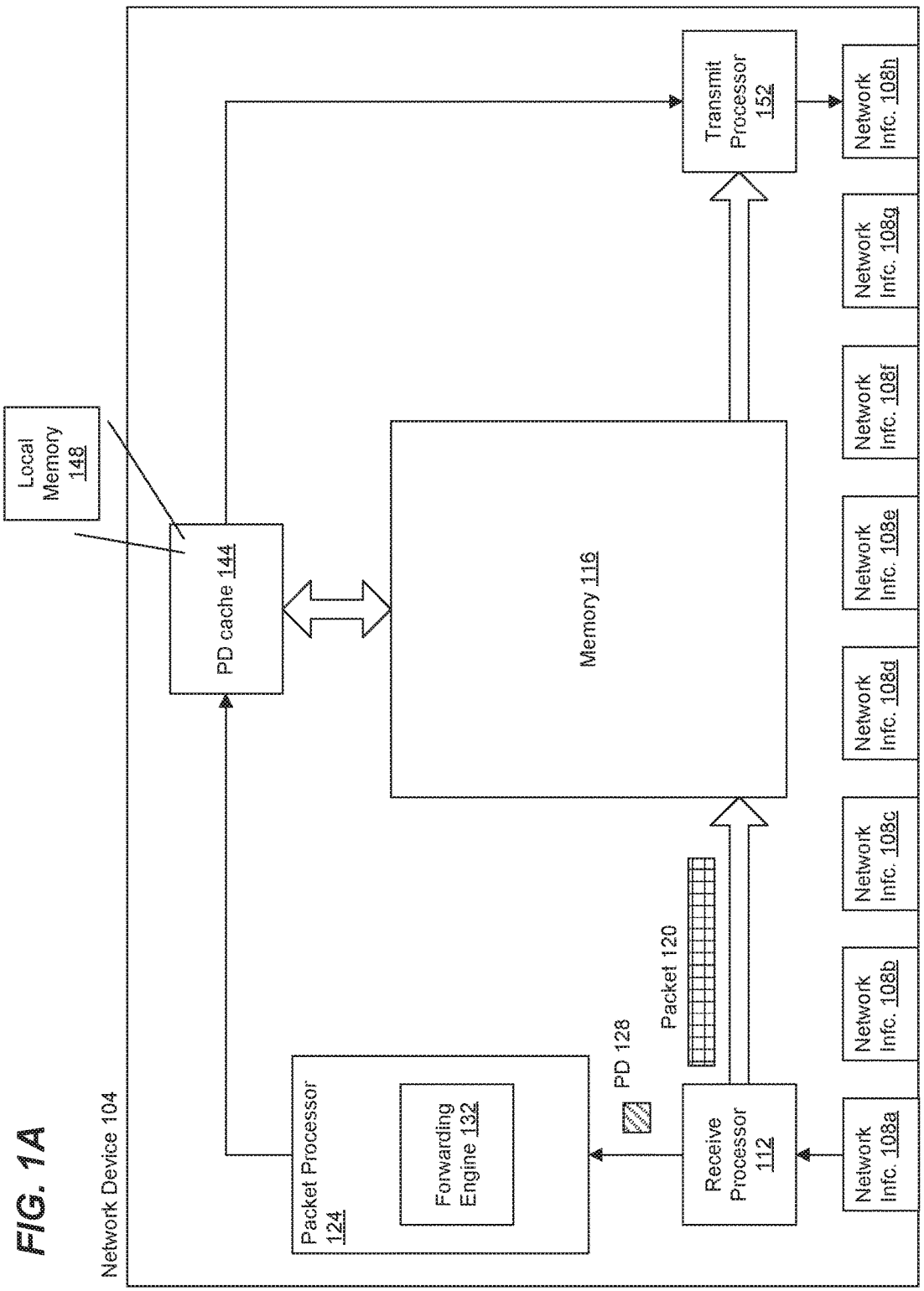
FIG. 1A is a block diagram of an example network device utilizes a memory device that stores i) packet data and ii) enqueued packet descriptors, according to an embodiment.

FIG. 1A is a block diagram of an example network device 104 that stores both packet data and packet descriptors in a packet memory (sometimes referred to a packet buffer), according to an embodiment. The network device 104 includes a plurality of network interfaces (e.g., ports) 108 configured to couple to respective network links. The network device 104 also includes one or more receive processors 112 coupled to the network interfaces 108. Although only one receive processor 112 is shown in FIG. 1A, and the one receive processor 112 is shown as being coupled to only one network interface 108, the network device 104 includes multiple receive processors 112 and each of the multiple processors 112 is coupled to a respective set of one or more network interface 108, in some embodiments.

The receive processor 112 is configured to store packet data (e.g., at least payloads) corresponding to received packets in a memory 116. In some embodiments, the memory 116 is also used for storage of packet descriptors, as will be described in more detail below. In FIG. 1A, the receive processor 112 is illustrated storing a packet 120 in the memory 116. However, the receive processor 112 stores, for each of multiple packets, only the payload of the packet in the memory 116 at least initially, according to an embodiment. At least a portion of a header of the packet is later stored in the memory 116 by the network processor 14, according to an embodiment. The receive processor 112 stores, for each of multiple packets, the payload of the packet and a portion of a header of the packet in the memory 116 at least initially, according to another embodiment. A remaining portion of a header of the packet is later stored in the memory 116 by the network processor 14, according to an embodiment. The receive processor 112 stores, for each of multiple packets, the entire packet in the memory 116, according to yet another embodiment.

The memory 116 includes one or more read/write interfaces (not shown), and the receive processor 112 uses the one or more read/write interfaces to store received packets (or at least payloads of the packets) in the memory 116. In an embodiment, the read/write interfaces of the memory 116 have a data width suitable for reading/writing packets of 1000 or more bytes, in an embodiment. As an illustrative embodiment, a data width of the read/write interfaces is 128 bytes. In an embodiment, a data width of the read/write interfaces is greater than 100 bytes. In another embodiment, a data width of the read/write interfaces is greater than 60 bytes.

In an embodiment, the receive processor 112 includes a direct memory access (DMA) unit configured to store received packets (or at least payloads of the packets) in the memory 116 via the one or more read/write interfaces of the memory 116.

The receive processor 112 generates, for each of multiple packets, a descriptor associated with the packet, according to an embodiment. Each packet descriptor includes information regarding the corresponding packet, such as header information from a header of the packet. Each packet descriptor includes location information regarding a location of the corresponding packet in the memory 116, according to an embodiment. Each packet descriptor has a data length that is much shorter than a length of a typical packet, according to an embodiment. In an illustrative embodiment, each of at some packet descriptors has a suitable length between 50 bits and 70 bits. In another embodiment, each of at some packet descriptors has a suitable length less than or equal to 50 bits. In another embodiment, each of at some packet descriptors has a suitable length less than or equal to 80 bits.

The receive processor 112 provides the packet descriptors to a packet processor 124, which is configured to process packets (e.g., by analyzing packet descriptors corresponding to the packets), in an embodiment. In FIG. 1A, the receive processor 112 is illustrated generating a packet descriptor 128 and providing the packet descriptor 128 to the packet processor 124.

The packet processor 124 includes a forwarding engine 132. The forwarding engine 132 is configured to analyze at least header information (e.g., in packet descriptors) corresponding to packets to determine network interfaces 108 via which the packets are to be transmitted (referred to herein as "target network interfaces"). As merely an illustrative example, the forwarding engine 132 is configured to use a destination address in a header of a packet to perform a lookup in a forwarding database (not shown), which stores correspondences between destination addresses and network interfaces 108, to determine a target network interface for the packet. As another illustrative example, the forwarding engine 132 is configured to use a VLAN ID in a header of a packet to perform a lookup in a forwarding database (not shown) (e.g. the same forwarding database discussed above or a different forwarding database), which stores correspondences between VLAN IDs and network interfaces 108, to determine a particular set of one or more target network interfaces 108 for the packet. The forwarding engine 132 is configured to store an ID of a target network interface (or set of multiple target network interfaces) in the packet descriptor corresponding to the packet, according to an embodiment.

The network device 104 includes one or more packet descriptor cache units 144 that implement transmit queues for enqueuing packet descriptors corresponding to packets that are to be transmitted via target network interfaces 108. Although one packet descriptor cache unit 144 is illustrated in FIG. 1A, the network device 104 includes multiple packet descriptor cache units 144 that each correspond to a respective set of one or more target network interfaces 108, and each multiple packet descriptor cache unit 144 implements transmit queues corresponding to the respective set of one or more target network interfaces 108, according to an embodiment.

In an embodiment, the packet descriptor cache unit 144 implements multiple transmit queues for each of multiple network interfaces 108. For example, different transmit queues, all corresponding to a single network interface 108, each correspond to a different priority, in an embodiment.

The packet descriptor cache unit 144 receives packet descriptors and stores the packet descriptors into appropriate transmit queues corresponding to appropriate target network interfaces 108. For example, the packet descriptor cache unit 144 analyzes information in the packet descriptors (e.g., target network interface IDs, priority information, etc.) to determine appropriate transmit queues into which the packet descriptors are to be stored. As an illustrative example, respective pluralities of transmit queues correspond to respective ports, where each transmit queue corresponding to a single port corresponds to a respective priority level, according to an embodiment. At least some of the transmit queues are arranged as first-in-first-out (FIFO) linked lists, according to an embodiment. For example, a transmit queue comprises an ordered set of elements of a linked list, where elements of the linked list include respective packet descriptors in the transmit queue, according to an embodiment. Each of at least some elements of the linked list includes a pointer to a memory address of a subsequent element in the linked list, according to an embodiment. Packet descriptors being added to the transmit queue (e.g., corresponding to packets being enqueued for transmission) correspond to new elements added to a tail of the linked list, whereas packet descriptors being removed from the transmit queue (e.g., corresponding to packets whose turn it is to be transmitted) correspond to elements removed from a head of the linked list, according to an embodiment.

The packet descriptor cache unit 144 includes, or is coupled to a local memory 148, for storing packet descriptors in transmit queues. The local memory 148 is a relatively fast, but small memory such as SRAM, while the memory 116 typically is a slower but significantly larger memory such as DRAM or Flash, etc., according to an embodiment.

When a transmit queue is of a suitably small length (e.g., includes a suitably small number of linked list elements, according to an embodiment), the transmit queue is stored entirely in the local memory 148, according to an embodiment. But when packet descriptors are added to a tail of the transmit queue at a rate that is greater than a rate at which packet descriptors are being removed from a head of the transmit queue, the length of the transmit queue will increase. When the length of the transmit queue increases to a suitable level, the packet descriptor cache unit 144 transfers some of packet descriptors (e.g., between the head and tail of the transmit queue) from the local memory 148 to the memory 116, according to an embodiment.

As packet descriptors are removed from the head of the transmit queue (e.g., corresponding to packets being transmitted), packet descriptors stored in the memory 116 become close to a head of a transmit queue and/or as a length of the queue decreases ( ), the packet descriptor cache unit 144 transfers packet descriptors from the memory 116 to the local memory 148. Thus, the local memory 148 acts as a cache to the memory 116, as will be described in more detail below. For example, packet descriptors received from the packet processor 124 are first stored in the local memory 148 before being transferred to the memory 116 by the packet descriptor cache unit 144, and packet descriptors stored in the memory 116 are first transferred to the local memory 148 before being removed from the transmit queue for packet transmission, according to an embodiment.

In an embodiment, the head of the linked list and the tail of the linked list are active parts of the linked list that require low latency and thus are "cached" in the local memory 148. On the other hand, a middle part of the linked list (e.g., located between the head and the tail) is inactive and thus can be stored in a relatively slower and/or higher latency memory (e.g., the memory 116), according to an embodiment. As packet descriptors are removed from the head of the linked list (e.g., corresponding to packets being transmitted), packet descriptors in the middle of the linked list become closer to the head. Thus if packet descriptors are stored in the memory 116, they will eventually be transferred to the local memory 148 as they become closer to the head of the linked list, according to an embodiment.

In an embodiment, determining whether a queue is to be bifurcated between the local memory 148 and the memory 116 is not based on measuring a cumulative length of memory contents within elements of the queue, according to an embodiment. Rather, determining whether the queue is to be bifurcated between the local memory 148 and the memory 116 is based on monitoring how many linked list elements are in the queue, according to an embodiment.

The local memory 148 includes one or more read/write interfaces (not shown), and the packet descriptor cache unit 144 uses the one or more read/write interfaces to store packet descriptors received from the packet processor 124 in the local memory 148. Similarly, the packet descriptor cache unit 144 uses the one or more read/write interfaces to retrieve packet descriptors in the local memory 148 when the packet descriptors reach heads of the transmit queues. In an embodiment, the one or more read/write interfaces of the local memory 148 have a data width suitable for reading/writing packet descriptors, in an embodiment. As an illustrative embodiment, a data width of the one or more read/write interfaces is between 50 bits and 70 bits, inclusive. In an embodiment, a data width of the one or more read/write interfaces is less than or equal to 80 bits. In another embodiment, a data width of the one or more read/write interface is less than or equal to 50 bits.

As discussed above, the memory 116 is configured for storage of units of data (e.g., packet data) that are much larger than packet descriptors (e.g., packet payloads), according to an embodiment. Thus, when transferring packet descriptors to the memory 116, the packet descriptor cache unit 144 assembles multiple packet descriptors into a single storage unit (sometimes referred to herein as a "data chunk"), and then stores the single storage unit to the memory 116 via the read/write interface of the memory 116, according to an embodiment. Similarly, when retrieving packet descriptors from the memory 116, the packet descriptor cache unit 144 retrieves a single storage unit having multiple packet descriptors via the read/write interface of the memory 116, according to an embodiment.

As discussed above, a transmit queue is configured as a linked list of ordered elements, with each of at least some elements including a pointer to a memory location of a subsequent element in the linked list, according to an embodiment. When some of the elements are stored in the memory 116, however, multiple elements (e.g., a data chunk) are stored within a single row of the memory 116 corresponding to a single memory address, according to an embodiment. Thus, in an embodiment, an order of elements within a single row of the memory 116 is maintained by the relative positions of elements within the single row, rather than pointers. When elements of a single linked list are stored in multiple data chunks in multiple rows of the memory 116, the ordering of elements in the linked list is maintained by ordering the data chunks, and each of one or more data chunks includes a pointer to an address in the memory 116 of a subsequent data chunk in the linked list, according to an embodiment. Thus, the packet descriptor cache unit 144 is configured to maintain linked list pointers for the memory 116 and the local memory 148 when a linked list is bifurcated between the memory 116 and the local memory 148, and as linked elements are transferred between the memory 116 and the local memory 148, according to an embodiment.

When a packet descriptor reaches the head of a transmit queue, the packet descriptor cache unit 144 provides the packet descriptor to a transmit processor 152 that corresponds to the target network interface 108 of the packet corresponding to the packet descriptor. Although only one transmit processor 152 is shown in FIG. 1A, and the one transmit processor 152 is shown as being coupled to only one network interface 108, the network device 104 includes multiple transmit processors 152 and each of the multiple transmit processors 152 is coupled to a respective set of one or network interface ports 108, in some embodiments.

The transmit processor 152 retrieves packet data corresponding to the packet descriptor from the memory 116 via the one or more read/write interfaces of the memory 116. In an embodiment, the transmit processor 152 includes a DMA unit configured to retrieve packets (or at least payloads of the packets) in the memory 116 via the one or more read/write interfaces of the memory 116. In an embodiment, the packet descriptor includes location information indicating a location of packet data in the memory 116, and the transmit processor 152 uses the location information to retrieve packet data corresponding to the packet descriptor from the memory 116. The transmit processor 152 then provides the packet data to the network interface 108 for transmission.

The receive processor 112 is implemented using i) one or more processors executing machine readable instructions stored in one or more memories, ii) hardware circuitry (e.g., one or more hardware state machines), iii) or a combination of i) and ii), in some embodiments.

The packet processor 124 is implemented using i) one or more processors executing machine readable instructions stored in one or more memories, ii) hardware circuitry (e.g., one or more hardware state machines), iii) or a combination of i) and ii), in some embodiments.

The transmit processor 152 is implemented using i) one or more processors executing machine readable instructions stored in one or more memories, ii) hardware circuitry (e.g., one or more hardware state machines), iii) or a combination of i) and ii), in some embodiments.

Figure 1B:
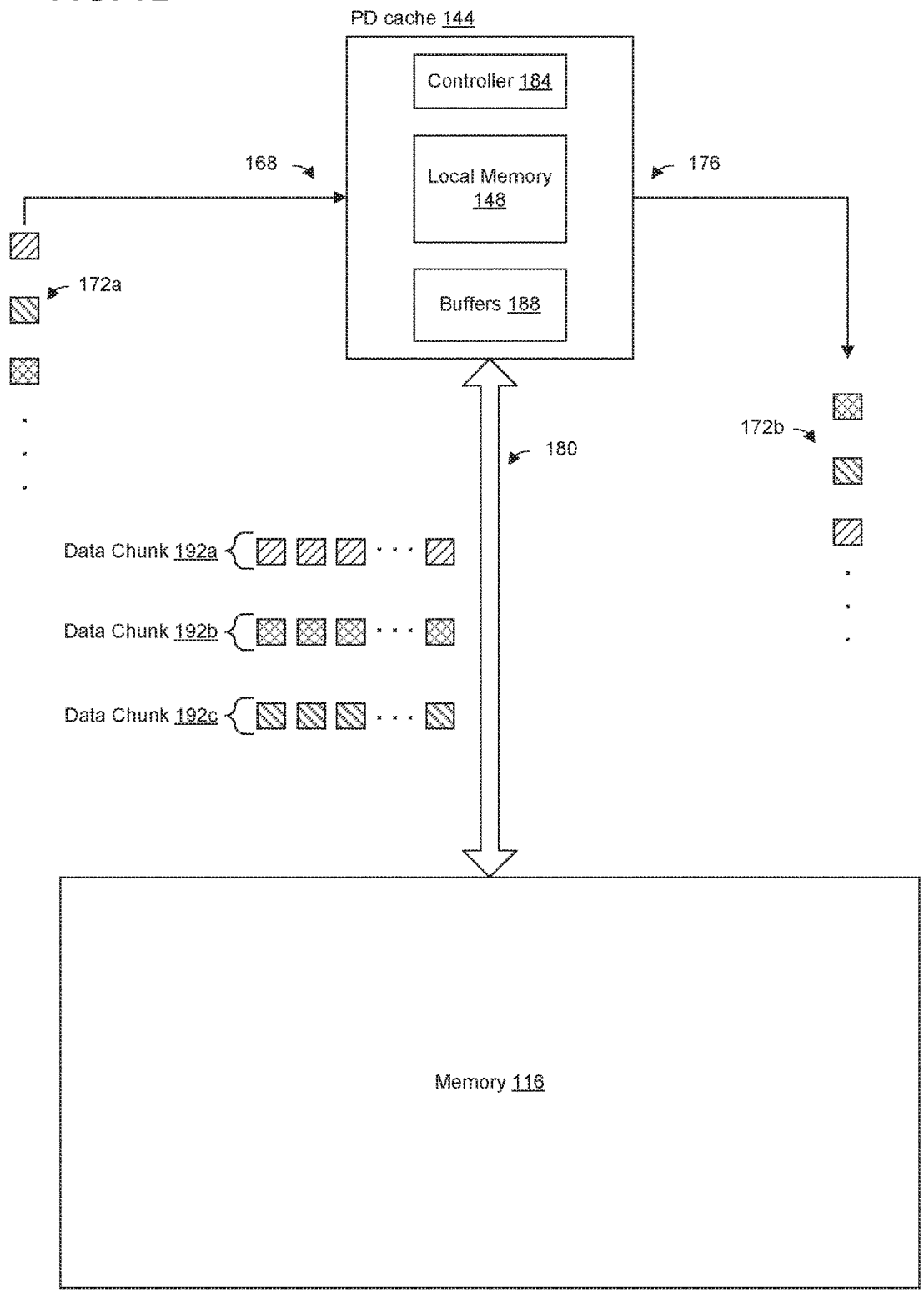
FIG. 1B is a block diagram of a packet descriptor cache unit of the network device of FIG. 1A, according to an embodiment.

FIG. 1B is a block diagram of the packet descriptor cache unit 144, according to an embodiment. The packet descriptor cache unit 144 receives packet descriptors 172a, e.g., from the packet processor 124, via an interface 168 and enqueues the packet descriptors 172a in transmit queues. The received packet descriptors 172a are destined for different transmit queues, where packet descriptors 172a destined for different transmit queues is represented in FIG. 1B as packet descriptors 172 with different fill patterns.

The packet descriptor cache unit 144 provides, e.g., to the transmit processor 152, dequeued packet descriptors 172b via an interface 176, the packet descriptors 172b having been retrieved from transmit queues. The packet descriptor cache unit 144 also stores packet descriptors to, and retrieves packet descriptors from, the memory 116 via an interface 180. A data width of the interface 180 is significantly wider than a data width of the interface 168 and a data width of the interface 176, in some embodiments. For example, as discussed above, the memory 116 is configured for storage of packets having lengths typically greater than 1000 bytes, whereas individual packet descriptors have a width of less than 10 bytes, in some embodiments; and the data width of the interface 180 is configured according to a data width of a read/write interface of the memory 116.

A controller 184 (e.g., a queue controller) maintains transmit queues that are implemented in the local memory 148 (sometimes referred to herein as a "queue memory"), and in some cases, in the memory 116. In an embodiment, the controller 184 maintains transmit queues as respective linked lists. As discussed above, each of at least some elements of a linked list includes a pointer to a subsequent element in the linked list, the controller 184 is configured to maintain the linked list pointers, according to an embodiment. When the packet descriptor cache unit 144 receives a packet descriptor 172 via the interface 168, the controller 184 stores the packet descriptor 172 in the local memory 148 within an appropriate transmit queue, e.g., at a tail of the transmit queue. For example, the controller 184 updates a pointer in a previous tail of the transmit queue to point to the address in the local memory 148 of the new packet descriptor 172, according to an embodiment. The controller 184 also retrieves packet descriptors 172 from the local memory 148, e.g., from heads of the transmit queues, and provides the packet descriptors 172 to the interface 176.

The controller 184 also retrieves packet descriptors from the local memory 148, and stores the packet descriptors in the memory 116 via the interface 180. For example, when a transmit queue reaches a threshold length, the controller 184 retrieves packet descriptors in the transmit queue, in the local memory 148, and stores the packet descriptors in the memory 116 via the interface 180, according to an embodiment. As another example, when a fill level of the local memory 148 reaches a threshold, the controller 184 retrieves packet descriptors in a transmit queue, in the local memory 148, and stores the packet descriptors in the memory 116 via the interface 180, according to an embodiment. By transferring packet descriptors from the local memory 148 to the memory 116, the controller 184 prevents, at least in some circumstances, the local memory 148 from filling, which may cause errors such as overwriting of packet descriptors in a transmit queue or dropping of packet descriptors. Also, by permitting the transfer of packet descriptors from the local memory 148 to the memory 116, the overall size of the local memory 148 can be kept smaller than a system in which packet descriptors could not be transferred from the local memory 148 to the memory 116. Additionally, as described in more detail below, the controller 184 transfers packet descriptors in a queue from the memory 116 (which is relatively slower and/or has a relatively higher latency) to the local memory 148 (which is relatively faster and/or has a relatively lower latency) before those packet descriptors reach a head of the queue. Thus, from a system perspective, a rate and/or a latency associated with writing and reading packet descriptors from a transmit queue is consistent with using only the local memory 148 for storage of descriptors, according to an embodiment.

To facilitate storage of packet descriptors in the memory 116, which is configured for storage of much larger units of data such as packet payloads, the controller 184 retrieves multiple packet descriptors from a single queue (linked list) and assembles a wider unit of data (a data chunk), that corresponds to a data width of the read/write interface of the memory 116, according to an embodiment. The controller 184 assembles the data chunk in a buffer 188, which has a data width that corresponds to the data width of the read/write interface of the memory 116, according to an embodiment. In an embodiment, relative positions of packet descriptors within the buffer 188 correspond to an order of those elements within the linked list.

The packet descriptor cache unit 144 includes multiple buffers 188 corresponding to multiple transmit queues, in an embodiment. The packet descriptor cache unit 144 includes two buffers 188 for each of multiple transmit queues, in an embodiment. The packet descriptor cache unit 144 includes more than two (e.g., three, four, five, etc.) buffers 188 for each of multiple transmit queues, in another embodiment.

When the controller 184 has assembled a data chunk in the buffer 188, the controller 184 stores the data chunk to the memory 116 via the read/write interface of the memory 116, according to an embodiment. In an embodiment, the controller 184 updates a pointer corresponding to the linked list to point to a row of the memory 116 at which the data chunk was stored, according to an embodiment.

Similarly, when the controller 184 determines that packet descriptors stored in the memory 116 will soon need to be dequeued from the transmit queue (e.g., by determining that a head of a transmit queue is within a threshold distance of packet descriptors stored in the memory 116), the controller 184 retrieves a data chunk from the memory 116 using the read/write interface of the memory 116, and transfers packet descriptors in the retrieved data chunk to the local memory 148, according to an embodiment. The controller 184 stores the data chunk in a buffer 188, and then transfers packet descriptors from the buffer 188 to the local memory 148, according to an embodiment. In an embodiment, relative positions of packet descriptors within the buffer 188 correspond to an order of those elements within the linked list. Thus, the controller updates linked list pointers to linked list elements corresponding to the packet descriptors transferred from the buffer 188 to the local memory 148 using the relative positions of packet descriptors within the buffer 188, according to an embodiment.

FIG. 1B illustrates several data chunks 192 being transferred between the packet descriptor cache unit 144 and the memory 116 via the interface 180. The data chunks 192 were assembled in the buffers 188, and each data chunk 192 includes packet descriptors in a single transmit queue.

Although FIG. 1B illustrates the local memory 148 as included in the packet descriptor cache unit 144, the local memory 148 is separate from, but coupled to, the packet descriptor cache unit 144, and the local memory 148 is shared by, and coupled to, one or more other packet descriptor cache unit 144 (not shown), according to an embodiment.

In some embodiments, a portion of the memory 116 is reserved for storage of packet descriptors. In an embodiment, the portion of the memory 116 is collectively reserved for multiple transmit queues, and each transmit queue among the multiple transmit queues is free to consume storage in the memory 116 according to a length of the transmit queue. In practice, most transmit queues at any particular time will remain relatively short and will consume little if any of the reserved storage in the memory 116, whereas a small number of transmit queues may become relatively long and be the largest consumers of the reserved storage in the memory 116, according to an embodiment.

Thus, most transmit queues will remain entirely in the local memory 148 at any particular time, and when a transmit queue becomes relatively long, the controller 184 transfers packet descriptors in the transmit queue to the memory 116 as discussed above, according to an embodiment. An amount of storage in the memory 116 is reserved for multiple transmit queues as a whole, where each transmit queue is allowed to consume as much of the reserved storage in the memory 116 that is available, according to an embodiment. In other words, each transmit queue is not individually guaranteed storage space in the memory 116 reserved only for that single transmit queue, but rather a set of multiple transmit queues are guaranteed, as a whole, an amount of shared storage in the memory, according to an embodiment.

In another embodiment, a respective portion of the memory 116 is reserved for respective transmit queues, and each transmit queue consumes storage in the memory 116 only in the corresponding reserved portion. For example, each of at least some transmit queues is individually guaranteed storage space in the memory 116 reserved only for that single transmit queue, according to an embodiment.

The controller 184 is implemented using i) one or more processors executing machine readable instructions stored in one or more memories, ii) hardware circuitry (e.g., one or more hardware state machines), iii) or a combination of i) and ii), in some embodiments.

Figure 2:
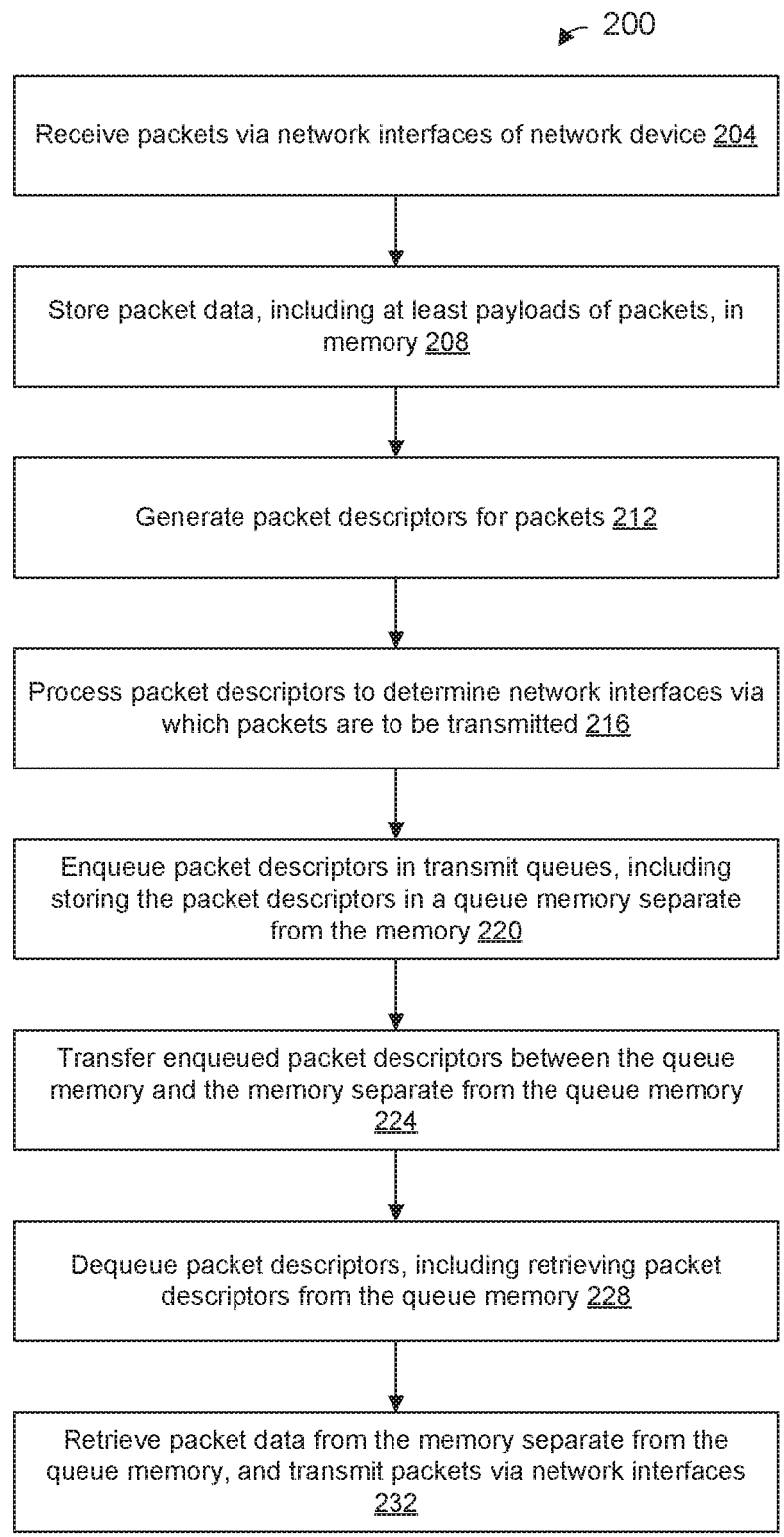
FIG. 2 is a flow diagram of an example method for processing packets in a network device, such as the network device of FIG. 1A, according to an embodiment.

FIG. 2 is a flow diagram of an example method 200 for processing packets in a network device, according to an embodiment. The network device 104 of FIGS. 1A and 1B is configured to implement the method 200, according to an embodiment, and FIG. 2 is described in the context of the network device 104 for explanatory purposes. In other embodiments, however, another suitable network device different than the network device 104 is configured to implement the method 200.

At block 204, packets are received via a plurality of network interfaces of a network device. For example, packets are received via the network interfaces 108, according to an embodiment.

At block 208, packet data (e.g., at least payloads of packets) corresponding to at least some of the packets received at block 204 are stored in a memory, such as the memory 116. In an embodiment, the memory has a data width of more than 100 bytes to facilitate efficient reading and writing of packet data corresponding to packets of 1000 or more bytes. As an illustrative embodiment, a data width of the memory is 128 bytes. In another embodiment, the memory has a data width of more than 50 bytes. In an embodiment, the memory includes a read/write interface with a data width of more than 100 bytes to facilitate efficient reading and writing of packet data corresponding to packets of 1000 or more bytes. As an illustrative embodiment, a data width of the read/write interface is 128 bytes. In an embodiment, a data width of the read/write interface is greater than 50 bytes.

At block 212, the network device generates, for at least some of the packets received at block 204, packet descriptors associated with the packets. Each packet descriptor includes information regarding the corresponding packet, such as header information from a header of the packet. Each packet descriptor includes location information regarding a location of the corresponding packet in the memory, according to an embodiment. Each packet descriptor has a data length that is much shorter than a length of a typical packet, according to an embodiment. In an illustrative embodiment, each of at some packet descriptors has a suitable length between 50 bits and 70 bits. In another embodiment, each of at some packet descriptors has a suitable length less than or equal to 50 bits. In another embodiment, each of at some packet descriptors has a suitable length less than or equal to 80 bits.

At block 216, the network interface processes packet descriptors generated at block 212 to determine network interfaces via which corresponding packets are to be transmitted. For example, the packet processor 124 processes packet descriptors as described above, according to an embodiment.

At block 220, the network interface enqueues at least some of the packet descriptors in a plurality of transmit queues corresponding to network interfaces via which corresponding packets are to be transmitted. In an embodiment, the plurality of transmit queues are implemented with a queue memory (e.g., the local memory 148) separate from the memory (e.g., the memory 116), and enqueuing packet descriptors in the transmit queues includes storing packet descriptors in the queue memory. In an embodiment, the packet descriptor cache unit 144 enqueues packet descriptors to transmit queues, including storing packet descriptors to the local memory 148.

In an embodiment, a read/write interface of the queue memory has a data width suitable for reading/writing packet descriptors as opposed to packets, in an embodiment. As an illustrative embodiment, a data width of the read/write interface is between 50 bits and 70 bits, inclusive. In an embodiment, a data width of the read/write interface is less than or equal to 80 bits. In another embodiment, a data width of the read/write interface is less than or equal to 50 bits.

At block 224, the network device transfers at least some descriptors between the queue memory and the memory. For example, in response to detecting that a length of a transmit queue meets a threshold, at least some packet descriptors in the transmit queue are transferred to the memory, according to an embodiment. As another example, in response to detecting that a length of a transmit queue no longer meets a threshold (e.g., the same threshold as above or a different threshold), at least some packet descriptors in the PB/PD memory corresponding to the transmit queue are transferred from the PB/PD memory to the queue memory, according to an embodiment. In another embodiment, at least some packet descriptors in the transmit queue are transferred to the PB/PD memory in response to detecting that a length of a portion of the transmit queue in the queue memory meets a threshold. In an embodiment, in response to detecting that a length of a part of the transmit queue no longer meets a threshold (e.g., the same threshold as above or a different threshold), at least some packet descriptors in the PB/PD memory corresponding to the transmit queue are transferred from the PB/PD memory to the queue memory, according to an embodiment. Block 224 is implemented using the controller 184 and the buffers 188, according to an embodiment.

At block 228, the network device dequeues packet descriptors from the transmit queues. In an embodiment, dequeuing packet descriptors includes retrieving packet descriptors from the queue memory. In an embodiment, the packet descriptor cache unit 144 performs block 228.

At block 232, packet data (e.g., at least packet payloads) are retrieved from the PB/PD memory in connection with the dequeuing of packet descriptors at block 228, and packets are transmitted via network interfaces. For example, in an embodiment, dequeuing a packet descriptor at block 228 indicates that the corresponding packet should be transmitted. In some embodiments, the packet descriptor includes location information that indicates a location in the PB/PD memory at which packet data for the packet is stored, and block 232 includes using the location information in the packet descriptor to retrieve packet data corresponding to the packet from the PB/PD memory. Block 232 is implemented by the transmit processor 152, according to an embodiment.

Referring again to FIG. 1B, in some embodiments, the controller 184 maintains transmit queues of packet descriptors as linked lists. In some embodiments, the controller 184 maintains linked lists having multiple parts, e.g., a head part, a tail part, and a middle part. In some embodiments, the number of parts of a linked list depends on a length of the linked list, e.g., a number of packet descriptors in the linked list. FIGS. 3A-C are diagrams of an example linked list 300 of packet descriptors 304 maintained by the controller 184, according to an embodiment.

In FIG. 3A, the linked list 300 comprises only a head part and is entirely stored in the local memory 148 due to a length of the linked list 300. The controller 184 maintains a pointer to a head of the linked list 300 (HEAD.head), and a pointer to a tail of the linked list 300 (TAIL.tail). HEAD.head and TAIL.tail are pointers to locations in the local memory 148. Packet descriptors 304 that are to be enqueued are received via the interface 168 (FIG. 1B); the received packet descriptors 304 are added to a tail of the linked list and the controller 184 updates the TAIL.tail pointer. In other words, packet descriptors 304 received via the interface 168 are stored in the local memory 148.

Similarly, packet descriptors 304 that are to be dequeued are removed from a head of the linked list 300 and provided to the interface 176 (FIG. 1B); and the controller 184 updates the HEAD.head pointer. In other words, packet descriptors 304 dequeued from the linked list 300 are retrieved from the local memory 148.

FIG. 3B illustrates the linked list 300 after the linked list 300 has grown in comparison to FIG. 3A. In response to the linked list 300 growing, the controller 184 partitions the linked list 300 into the head part and a tail part. For example, the controller 184 partitions the linked list 300 into the head part and the tail part in response to a length of the linked list 300 meeting a first threshold. The controller 184 maintains a pointer to a head of the tail part (TAIL.head), and a pointer to a tail of the head part (HEAD.tail). The HEAD.head pointer acts as a pointer to a head of the head part, and TAIL.tail acts as a pointer to a tail of the tail part.

When the linked list 300 is of the form shown in FIG. 3B, packet descriptors 304 received via the interface 168 (FIG. 1B) continue to be stored in the local memory 148, and packet descriptors 304 dequeued from the linked list 300 continue to be retrieved from the local memory 148.

FIG. 3C illustrates the linked list 300 after the linked list 300 has grown in comparison to FIG. 3B. In response to the linked list 300 growing, the controller 184 has partitioned the linked list 300 into the head part, the tail part, and a middle (FRAG) part. For example, the controller 184 partitions the linked list 300 into the head part, the tail part, and the middle part in response to a length of the linked list 300 meeting a second threshold greater than the first threshold. The controller 184 maintains a pointer to a head of the middle part (FRAG.head), and a pointer to a tail of the middle part (FRAG.tail). Additionally, the controller 184 transfers the middle part to the memory 116. Thus, FRAG.head and FRAG.tail are pointers to locations in the memory 116 that each include multiple elements of the linked list (respective data chunks). In an embodiment, the controller 184 also maintains one or more pointers that point to subsequent data chunks in the memory 116 corresponding to the linked list. For example, FIG. 3C illustrates a pointer, associated with the FRAG.head data chunk, that points to a subsequent data chunk in the memory 116. On the other hand, the pointers HEAD.head, HEAD.tail, TAIL.head, and TAIL.tail are pointers to locations in the local memory 148.

When the linked list 300 is of the form shown in FIG. 3C, packet descriptors 304 received via the interface 168 (FIG. 1B) continue to be stored in the local memory 148, and packet descriptors 304 dequeued from the linked list 300 continue to be retrieved from the local memory 148. Additionally, the controller 184 transfers packet descriptors in the middle part between the local memory 148 and the memory 116, as will be described in more detail below.

When the linked list 300 decreases in length, parts of the linked list 300 are consolidated in a reverse manner so that the number of parts decreases, according to an embodiment. For example, the controller 184 consolidates the linked list 300 into only the head part and the tail part (e.g., the middle part contains no descriptors) in response to the length of the linked list 300 no longer meeting the second threshold (or a different third threshold to provide hysteresis), according to an embodiment. Similarly, the controller 184 consolidates the linked list 300 into only the head part (e.g., the tail part or the middle part contain no descriptors) in response to the length of the linked list 300 no longer meeting the first threshold (or a different fourth threshold to provide hysteresis), according to an embodiment.

Referring again to FIG. 1B, to account for an enqueue burst in which received packet descriptors 172*a* are received at a high rate, the packet descriptor cache unit 144 is capable of transferring packet descriptors in the middle part from the local memory 148 to the memory 116 at a rate that is at least equal to a rate at which the packet descriptor cache unit 144 is capable of enqueuing the packet descriptors 172*a* in the local memory 148, according to an embodiment. Similarly, to account for a dequeue burst in which packet descriptors 172*b* are dequeued at a high rate, the packet descriptor cache unit 144 is capable of transferring packet descriptors in the middle part from the memory 116 to the local memory 148 at a rate that is at least equal to a rate at which the packet descriptor cache unit 144 is capable of dequeuing the packet descriptors 172*b* from the local memory 148, according to an embodiment.

The controller 184 stores linked list parameters, such as HEAD.head, HEAD.tail, TAIL.head, TAIL.tail, FRAG.head, and FRAG.tail, in the local memory 148, according to an embodiment. In another embodiment, the packet descriptor cache unit 144 includes or is coupled to another memory (not shown), separate from the local memory 148 and the memory 116, and the controller 184 stores the linked list parameters in the other memory. The packet descriptor cache unit 144 includes, and/or is coupled to, a plurality of registers (not shown) for storing linked list parameters, such as HEAD.head, HEAD.tail, TAIL.head, TAIL.tail, FRAG.head, and FRAG.tail, according to another embodiment.

When the linked list 300 does not include, or is not using, the middle part, the FRAG.head and FRAG.tail pointers are set to a predetermined value (e.g., null) which indicates that the linked list 300 does not include, or is not using, the middle part. Similarly, when the linked list 300 does not include, or is not using, the tail part, the HEAD.tail and TAIL.head pointers are set to a predetermined value (e.g., null) which indicates that the linked list 300 does not include, or is not using, the tail part.

FIGS. 4A-D are diagrams of an example linked list 400 of packet descriptors 404 illustrating packet descriptors being transferred from the local memory 148 to the memory 116, according to an embodiment. The packet descriptors 404 illustrated in FIG. 4A are all stored in the local memory 148, and the controller 184 has determined that the packet descriptors labelled 1-20 are to be transferred to the memory 116. For example, the controller 184 has determined that the packet descriptors labelled 1-20 are to be moved from a tail part of the linked list 400 to a middle part (not shown).

FIG. 4B illustrates the linked list 400 after the controller 184 has moved the packet descriptor labelled 1 from the local memory 148 to one of the buffers 188. The controller 184 also has updated the pointer TAIL.head to point to the packet descriptor labelled 2.

FIG. 4C illustrates the linked list 400 after the controller 184 has moved the packet descriptor labelled 2 from the local memory 148 to the buffer 188. The controller 184 also has updated the pointer TAIL.head to point to the packet descriptor labelled 3.

Packet descriptors are transferred from the local memory 148 to the buffer 188 in a similar manner until the buffer 188 includes a suitable number of packet descriptors, e.g., until the buffer 188 includes a number of packet descriptors corresponding to a size of a data chunk. FIG. 4D illustrates the linked list 400 after the controller 184 has moved the packet descriptors 3-20 from the local memory 148 to the buffer 188. The controller 184 also has updated the pointer TAIL.head to point to a next packet descriptor in the linked list 400.

The contents of the buffer 188 in FIG. 4D are then stored to the memory 116 via the read/write interface of the memory 116. Additionally, the controller 184 updates the FRAG.tail pointer to account for the packet descriptors labelled 1-20 being stored in the memory 116.

In the embodiment illustrated in FIGS. 4A-D, packet descriptors that are to be transferred to the memory 116 are removed from tail part of the linked list 400.

In an embodiment, relative positions of packet descriptors within the buffer 188 correspond to an order of those elements within the linked list 400. In connection with transferring contents of the buffer 188 to the memory 116, the controller 184 updates pointers associated with linked list elements stored in the memory 116 (e.g., FRAG.tail, a pointer to the newly stored data chunk in the memory 116 from another data chunk corresponding to the linked list 400 and previously stored in the memory 116, etc.), according to an embodiment.

FIGS. 5A-D are diagrams of an example linked list 500 of packet descriptors 504 in which a portion of the linked list 500 is stored in the local memory 148 and another portion of the linked list 500 is stored in the memory 116, according to an embodiment. In particular, a head part and a tail part of the linked list 500 are stored in the local memory 148, whereas a middle part is stored in the memory 116.

In FIG. 5A, the controller 184 already retrieved a set of packet descriptors in the middle part from the memory 116 and stored the set of packet descriptors to one of the buffers 188, and the packet descriptors in the buffer 188 are labelled 1-20. For example, the controller 184 determined that the packet descriptors labelled 1-20 were to be moved from the middle part to the head part, and the controller 184 transferred the packet descriptors labelled 1-20 from the memory 116 to the buffer 188 responsive to the determination, in an embodiment. In an embodiment, the controller 184 also updates the FRAG.head pointer to reflect the removal of the packet descriptors labelled 1-20 from the memory 116, in an embodiment.

FIG. 5B illustrates the linked list 500 after the controller 184 has moved the packet descriptor labelled 1 from the buffer 188 to the local memory 148. In particular, the controller 184 added the packet descriptor labelled 1 to the head part of the linked list 500. The controller 184 also has updated the pointer HEAD.tail to point to the packet descriptor labelled 1.

FIG. 5C illustrates the linked list 500 after the controller 184 has moved the packet descriptor labelled 2 from the buffer 188 to the local memory 148. In particular, the controller 184 added the packet descriptor labelled 2 to the head part of the linked list 500. The controller 184 also has updated the pointer HEAD.tail to point to the packet descriptor labelled 2.

Packet descriptors are transferred from the buffer 188 to the local memory in a similar manner until the buffer 188 is empty. FIG. 5D illustrates the linked list 500 after the controller 184 has moved the packet descriptors 3-20 from the buffer 188 to the local memory 148. The controller 184 also has updated the pointer HEAD.tail to point to the packet descriptor labelled 20.

In the embodiment illustrated in FIGS. 5A-D, packet descriptors transferred from the memory 116 are added to the head part of the linked list 500.

In an embodiment, relative positions of packet descriptors within the buffer 188 correspond to an order of those elements within the linked list 500. Thus, the controller 184 updates pointers for elements of the linked list 500 stored in the local memory 148 based on the relative positions of packet descriptors within the buffer 188, according to an embodiment. In connection with transferring contents of from the buffer 188 to the local memory 148, the controller 184 updates pointers associated with linked list elements stored in the local memory 148 (e.g., HEAD.tail, pointers from elements in the linked list 500 from subsequent elements in the linked list 500, etc.), according to an embodiment.

In the scenarios illustrated in FIGS. 4A-D and 5A-D, a linked list is bifurcated, at times, between a first memory (e.g., the local memory 148) and a second memory (e.g., the memory 116). A controller, e.g., the controller 184, maintains linked list parameters (e.g., pointers to heads and tails of parts of the linked list, pointers between elements of the linked lists, pointers between data chunks (each including multiple linked list elements), etc.) corresponding to the different memories (e.g., the first memory and the second memory) at least when the linked list is bifurcated between the different memories, according to an embodiment.

Figure 6:
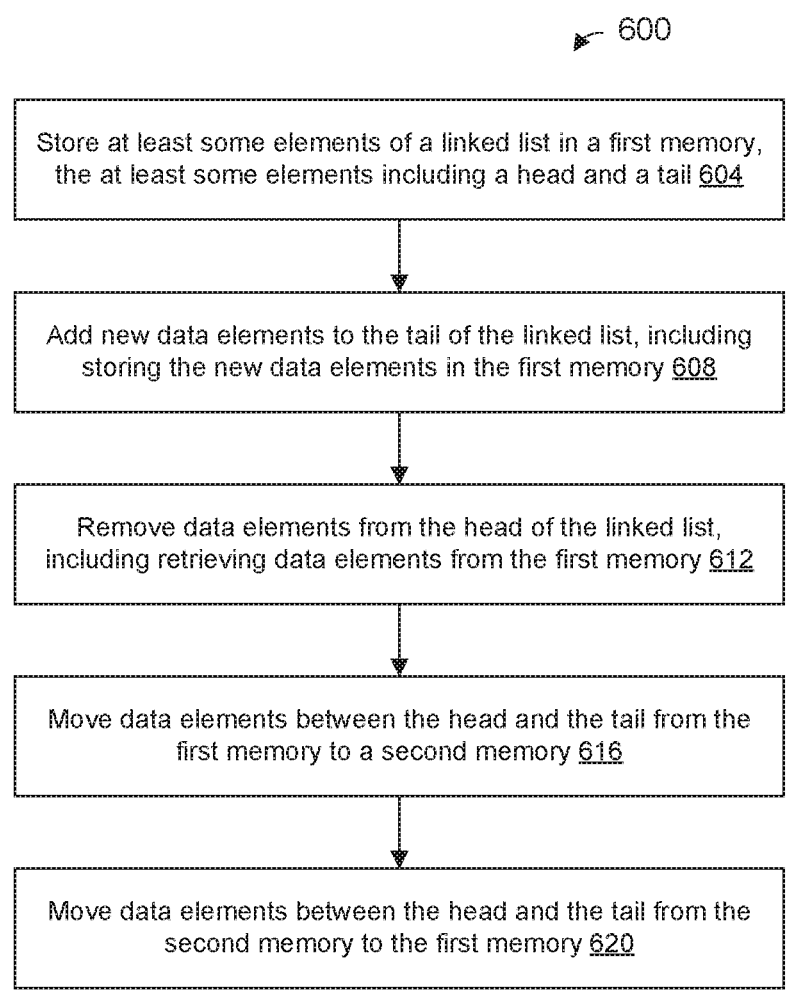
FIG. 6 is a flow diagram of an example method for maintaining a linked list in multiple memory devices, according to an embodiment.

FIG. 6 is a flow diagram of an example method 600 for maintaining a linked list in multiple memory devices, according to an embodiment. The packet descriptor cache unit 144 of FIGS. 1A and 1B is configured to implement the method 600, according to an embodiment, and FIG. 6 is described in the context of the packet descriptor cache unit 144 for explanatory purposes. In other embodiments, however, another device different than the packet descriptor cache unit 144 is configured to implement the method 600. In still other embodiments, a device in a computer such as a personal computer, a smartphone, a server, etc., is configured to implement the method 600.

At block 604, at least some elements of a linked list are stored in a first memory having a first read/write interface, where the at least some elements includes a head element of the linked list and a tail element of the linked list. For example, the packet descriptor cache unit 144 maintains a linked list of packet descriptors, and at least some elements of the linked list are stored in the local memory 148.

At block 608, new data elements are added to the linked list at a tail of the linked list, including storing the new data elements in the first memory via the first read/write interface. For example, the packet descriptor cache unit 144 adds packet descriptors 172a received via the interface 168 to a tail of the linked list, including storing the received packet descriptors 172a in the local memory 148 via a read/write interface of the local memory 148. Block 608 includes updating linked list parameters (e.g., linked list pointers) corresponding to the first memory, according to an embodiment.

At block 612, data elements are removed from the linked list at a head of the linked list, including retrieving the data elements from the first memory via the first read/write interface. For example, the packet descriptor cache unit 144 dequeues packet descriptors 172b from a head of the linked list, including retrieving the packet descriptors 172b from the local memory 148 via a read/write interface of the local memory 148. Block 612 includes updating linked list parameters (e.g., linked list pointers) corresponding to the first memory, according to an embodiment.

A length of the linked list (e.g., a number of data elements in the linked list) will dynamically vary as a first rate at which elements are added to the tail of the linked list (block 608) and a second rate at which elements are removed from the head of the linked list (block 612) vary.

At block 616, data elements in the linked list between the head and the tail are moved from the first memory to a second memory, separate from the first memory, having a second read/write interface that is separate from the first read/write interface.

In an embodiment, data elements are moved in response to a length of the linked list meeting a threshold. In another embodiment, data elements are moved in response to a length of a part of the linked list meeting a threshold. For example, as discussed above in connection with FIGS. 3A-C, a linked list can be partitioned into multiple parts (e.g., a head part, a tail part, and a middle part), and a length of a part of the linked list (e.g., the tail part) meeting a threshold may be a trigger for moving data elements from the first memory to the second memory, according to an embodiment. In an embodiment, the packet descriptor cache unit 144 is configured to move packet descriptors in a linked list from the local memory 148 to the memory 116 as discussed above.

As discussed above, the length of the linked list (e.g., the number of elements in the linked list) will vary over time as data elements are added to the tail of the linked list and data elements are removed from the head of the linked list (e.g., because the first rate at which elements are added to the tail of the linked list and the second rate at which elements are removed from the head of the linked list varies over time). Thus, when the length of the linked list reaches a suitable threshold, data elements will be transferred from the first memory to the second memory.

Block 616 includes updating linked list parameters (e.g., linked list pointers) corresponding to the second memory, according to an embodiment. Block 616 also includes updating linked list parameters (e.g., linked list pointers) corresponding to the first memory, according to an embodiment. For example, in an embodiment in which the linked list elements from a tail part of the linked list are moved to the second memory, the TAIL.head pointer is updated to point to a linked list element still remaining in the first memory; the FRAG.tail pointer is updated to point to a location in the second memory to which multiple linked list elements (a new data chunk) from the first memory were moved; and if a previous data chunk of linked list was already stored in the second memory, a pointer from the previous data chunk to the new data chunk in the second memory is updated.

Upon performing block 616, the linked list is bifurcated, at least for a time, between the first memory (e.g., the local memory 148) and the second memory (e.g., the memory 116). When the linked list is so bifurcated, a controller, e.g., the controller 184, maintains linked list parameters (e.g., pointers to heads and tails of parts of the linked list, pointers between elements of the linked lists, pointers between data chunks (each including multiple linked list elements), etc.) corresponding to the both the first memory and the second memory, according to an embodiment.

In some embodiments, block 616 includes using techniques discussed above in connection with FIGS. 4A-D.

At block 620, data elements in the linked list between the head and the tail are moved from the second memory to the first memory. In an embodiment, data elements are moved in response to a length of the linked list meeting no longer meeting a threshold. In an embodiment, the threshold used at block 620 is different than the threshold used at block 616 to implement hysteresis, for example. In another embodiment, the threshold used at block 620 is the same as the threshold used at block 616.

In another embodiment, data elements are moved at block 620 in response to a length of a part of the linked list meeting a threshold. For example, as discussed above in connection with FIGS. 3A-C, a linked list can be partitioned into multiple parts (e.g., a head part, a tail part, and a middle part), and a length of a part of the linked list (e.g., the head part) no longer meeting a threshold may be a trigger for moving data elements from the second memory to the first memory, according to an embodiment. In an embodiment, the threshold used at block 620 is different than the threshold used at block 616 to implement hysteresis, for example. In another embodiment, the threshold used at block 620 is the same as the threshold used at block 616.

In an embodiment, to ensure that the removal of data elements from the head of the linked list corresponds to retrieving the data elements from the first memory (e.g., not the second memory), data elements stored in the second memory are moved to the first memory prior to those data elements reaching the head of the linked list. Thus, in an embodiment, when a length of the head part falls below a suitable threshold and if data elements are stored in the second memory, data elements from the second memory are moved from the second memory to the head part of the linked list in the first memory so that, when it comes time to remove the data elements from the head of the linked list, those data elements will be in the first memory (e.g., not in the second memory).

Block 620 includes updating linked list parameters (e.g., linked list pointers) corresponding to the second memory, according to an embodiment. Block 620 also includes updating linked list parameters (e.g., linked list pointers) corresponding to the first memory, according to an embodiment. For example, in an embodiment, if the linked list elements (in an old data chunk) moved from the second memory to the first memory were associated with a pointer that pointed to next data chunk in the second memory, the FRAG.head pointer is updated to point to an address of the next data chunk in the second memory. If there are no other elements of the linked list remaining in the second memory, the FRAG.head pointer is updated (e.g., set to a predetermined value) to indicate that there are no other elements of the linked list remaining in the second memory, according to an embodiment. As another example, in an embodiment in which the linked list elements are moved from the second memory to a head part of the linked list in the first memory, the HEAD.tail pointer is updated to point to a linked list element that was moved from the second memory to the first memory; and pointers between elements moved from the second memory to the first memory are set based on relative positions within a row of the second memory of the data elements when they were stored in the second memory.

As discussed above, the length of the linked list (e.g., the number of elements in the linked list) will vary over time as data elements are added to the tail of the linked list and data elements are removed from the head of the linked list (e.g., because the first rate at which elements are added to the tail of the linked list and the second rate at which elements are removed from the head of the linked list varies over time). Thus, according to an embodiment, when the length of the linked list falls below a suitable threshold, the transfer of data elements from the first memory to the second memory ceases and the linked list, at least at some point, is entirely stored in the first memory (e.g., no data elements are stored in the second memory).

In some embodiments, block 620 includes using techniques discussed above in connection with FIGS. 5A-D.

At least in some embodiments, use of the method 600 lowers overall costs by permitting a smaller relatively fast and/or low latency first memory as compared to a system that uses a single memory to entirely store all of multiple linked lists. For instance, with the method 600 the following actions that typically require less latency are performed using the relative fast and/or low latency (but smaller) first memory: adding data elements to the tail of the linked list and removing data elements from the linked list, according to an embodiment. On the other hand, data elements between the head and the tail, which are inactive (e.g., will not need to be accessed until a future time), are moved (at least when the length of the linked list meets a threshold, for example) to the relatively slower and/or higher latency (but larger and/or cheaper) second memory, according to an embodiment. Prior to data elements stored in the second memory reaching the head of the linked list, the data elements are moved to the relatively fast first memory, according to an embodiment.

At least in some embodiments (e.g., in embodiments in which data elements are transferred at block 616 in response to a length of the linked list meeting a threshold), use of the method 600 permits multiple linked lists to dynamically share storage in the second memory without having to reserve dedicated storage in the second memory for each of the linked lists. For instance, in systems that need to maintain a relatively large number of linked lists, but in which it is likely that only a small number of linked lists will have a large length (e.g., a relatively high number of data elements) at any given time, the method 600 provides efficient use of the second memory, at least in some embodiments. For example, the method 600 permits use of a smaller size second memory as compared to a system that requires separate dedicated storage in the second memory for each linked list, at least in some embodiments.

At least in some embodiments (e.g., in embodiments in which data elements are transferred at block 620 in response to a length between the head and an element in the second memory falling below a threshold), the method 600 prevents "cache misses" in which a data element needing to be retrieved from the head of the linked list is not in the first memory and instead must be retrieved from the relatively slower and/or higher latency second memory.

In an embodiment, a data width of the second read/write interface is wider than a data width of the first read/write interface, such that multiple data elements can be stored in the second memory using a single write operation and/or multiple data elements can be retrieved from the second memory using a single read operation. In an embodiment, moving data elements from the first memory to the second memory includes: using multiple read operations to retrieve multiple data elements of the linked list from the first memory; aggregating the multiple data elements into a data chunk; and storing the data chunk to the second memory using a single write operation. In an embodiment, moving data elements from the second memory to the first memory includes: reading a data chunk from the second memory using a single read operation, the data chunk including multiple data elements of the linked list; and using multiple write operations to respectively store the multiple data elements to the first memory.

In an embodiment, the packet descriptor cache unit 144 is configured to move packet descriptors in a linked list between the memory 116 and the local memory 148 as discussed above.

In some embodiments, transferring data elements between the first memory and the second memory at blocks 616 and 620 permits the use of a smaller first memory as compared to a system that maintains storage of a linked list entirely within a single memory. For example, the linked list is used in a system that requires relatively fast storing of data elements to the tail of the linked list and/or fast reading of data elements from the head of the linked lists, and thus the first memory requires relatively fast read/write access times in order to accommodate the system requirements, according to an embodiment. On the other hand, the second memory has slower read/write access times and thus is generally cheaper (per unit of storage capacity) than the first memory, according to an embodiment. In some embodiments, the second memory is also used for storage of other types of data different than data stored in the linked list and the first memory. Overall costs are reduced because the size of the more expensive (per unit of storage capacity) first memory is reduced, according to an embodiment.

In some embodiments, the second memory has a slower access rate and/or a higher latency as compared to an access rate/latency of the first memory. In some embodiments, the second memory is significantly larger than the first memory. In some embodiments, the first memory is a static random access memory (SRAM), whereas the second memory is a dynamic random access memory (DRAM) or Flash memory. In some embodiments, the first memory is the local memory 148 discussed above, and the second memory is the memory 116 discussed above.

In an embodiment, an apparatus comprises: a first memory device configured to store: (i) a head part of a first-in-first-out (FIFO) queue, the FIFO queue structured as a linked list (LL) of LL elements arranged in an order in which the LL elements were added to the FIFO queue, the head part including a first plurality of LL elements arranged for retrieval from the FIFO queue in the order in which the LL elements were added to the FIFO queue, and (ii) a tail part of the FIFO queue, the tail part comprising a second plurality of LL elements arranged corresponding to an order in which the second plurality LL elements were added to the FIFO queue. The apparatus also comprises a second memory device that is separate from the first memory, the second memory configured to store a middle part of the FIFO queue, the middle part comprising a third plurality of LL elements following, in the order, the head part and preceding, in the order, the tail part. The apparatus further comprises a queue controller configured to: retrieve LL elements in the head part from the first memory device according to the order, move LL elements in the middle part from the second memory device to the head part in the first memory device prior to the head part becoming empty, and update LL parameters corresponding to the moved LL elements to indicate storage of the moved LL elements changing from the second memory device to the first memory device.

In other embodiments, the apparatus comprises one of, or any suitable combination of two or more of, the following features.

The queue controller is further configured to: move LL elements in the middle part from the second memory device to the head part in the first memory device in response to a number of LL elements in the head part falling below a threshold.

The LL parameters include pointers to memory locations at which LL elements are stored; and the queue controller is configured to update pointers corresponding to the LL elements moved from the middle part to the tail part to point to locations in the first memory.

The queue controller is further configured to: store new LL elements to the tail part in the first memory device, update LL parameters corresponding to the tail part to reflect addition of the new LL elements to the linked list, move LL elements in the tail part preceding, in the order, the new LL elements from the first memory device to the middle part in the second memory device, and update LL parameters corresponding to the LL elements moved from the tail part to the middle part to indicate storage of the LL elements moved from the tail part to the middle part having changed from the first memory device to the second memory device.

The queue controller is further configured to: move LL elements in the tail part preceding, in the order, the new LL elements from the first memory device to the middle part in the second memory device in response to one of i) a number of LL elements in the tail part meeting a first threshold, and ii) a number of LL elements in the LL meeting a second threshold.

The LL parameters include pointers to memory locations at which LL elements are stored; and the queue controller is configured to update one or more pointers corresponding to the LL elements moved from the tail part to the middle part to point to one or more locations in the second memory.

The queue controller is further configured to: update LL parameters corresponding to the head part to reflect removal of the LL elements from the linked list in connection with the retrieval of LL elements in the head part from the first memory device according to the order.

In another embodiment, a method includes storing in a first memory device: (i) a head part of a first-in-first-out (FIFO) queue, the FIFO queue structured as a linked list (LL) of LL elements arranged in an order in which the LL elements were added to the FIFO queue, the head part including a first plurality of LL elements arranged for retrieval from the FIFO queue in the order in which the LL elements were added to the FIFO queue, and (ii) a tail part of the FIFO queue, the tail part comprising a second plurality of LL elements arranged corresponding to an order in which the second plurality LL elements were added to the FIFO queue. The method also includes: storing, in a second memory device that is separate from the first memory, a middle part of the FIFO queue, the middle part comprising a third plurality of LL elements following, in the order, the head part and preceding, in the order, the tail part; and retrieving, from the first memory device, LL elements in the head part according to the order; moving, with a queue controller, LL elements in the middle part from the second memory device to the head part in the first memory device prior to the head part becoming empty; and updating, with the queue controller, LL parameters corresponding to the moved LL elements to indicate storage of the moved LL elements changing from the second memory device to the first memory device.

In other embodiments, the method comprises one of, or any suitable combination of two or more of, the following features.

Moving LL elements in the middle part from the second memory device to the head part in the first memory device is in response to determining, at the queue controller, that a number of LL elements in the head part fell below a threshold.

The LL parameters include pointers to memory locations at which LL elements are stored; and the method further comprises updating, with the queue controller, pointers corresponding to the LL elements moved from the middle part to the tail part to point to locations in the first memory.

The method further comprises: storing, in the first memory device, new LL elements to the tail part; updating, with the queue controller, LL parameters corresponding to the tail part to reflect addition of the new LL elements to the linked list; moving, with the queue controller, LL elements in the tail part preceding, in the order, the new LL elements from the first memory device to the middle part in the second memory device; and updating, with the queue controller, LL parameters corresponding to the LL elements moved from the tail part to the middle part to indicate storage of the LL elements moved from the tail part to the middle part having changed from the first memory device to the second memory device.

The method further comprises: moving, with the queue controller, LL elements in the tail part preceding, in the order, the new LL elements from the first memory device to the middle part in the second memory device in response to one of i) a number of LL elements in the tail part meeting a first threshold, and ii) a number of LL elements in the LL meeting a second threshold.

The LL parameters include pointers to memory locations at which LL elements are stored; and the method further comprises updating, with the queue controller, one or more pointers corresponding to the LL elements moved from the tail part to the middle part to point to one or more locations in the second memory.

In yet another embodiment, an apparatus comprises: a plurality of network interfaces configured to couple to a plurality of network links; and a packet processor configured to process packets received via the plurality of network interfaces and to determine network interfaces to which received packets are to be forwarded. The apparatus also comprises a first memory device configured to store: (i) a head part of a first-in-first-out (FIFO) transmit queue corresponding to at least one of the network interfaces, the FIFO transmit queue for storing packet descriptors corresponding to packets to be transmitted via the at least one network interface, the FIFO transmit queue structured as a linked list (LL) of LL elements arranged in an order in which the LL elements were added to the FIFO queue, the head part including a first plurality of LL elements arranged for retrieval from the FIFO queue in the order in which the LL elements were added to the FIFO queue, and (ii) a tail part of the FIFO queue, the tail part comprising a second plurality of LL elements arranged corresponding to an order in which the second plurality LL elements were added to the FIFO queue. The apparatus further comprises: a second memory device that is separate from the first memory, the second memory configured to store a middle part of the FIFO queue, the middle part comprising a third plurality of LL elements following, in the order, the head part and preceding, in the order, the tail part; and a queue controller configured to: store new LL elements in the tail part to the first memory device according to the order in connection with new packet descriptors being added to the transmit queue, retrieve LL elements in the head part from the first memory device according to the order in connection with transmission, via the at least one network interface, of packets corresponding to packet descriptors in the transmit queue, move LL elements in the middle part from the second memory device to the head part in the first memory device prior to the head part becoming empty, and update LL parameters corresponding to the moved LL elements to indicate storage of the moved LL elements changing from the second memory device to the first memory device.

In other embodiments, the apparatus comprises one of, or any suitable combination of two or more of, the following features.

The queue controller is further configured to: move LL elements in the middle part from the second memory device to the head part in the first memory device in response to a number of LL elements in the head part falling below a threshold.

The queue controller is further configured to: move LL elements in the tail part preceding, in the order, the new LL elements from the first memory device to the middle part in the second memory device, and update LL parameters corresponding to the LL elements moved from the tail part to the middle part to indicate storage of the LL elements moved from the tail part to the middle part having changed from the first memory device to the second memory device.

The apparatus further comprises: a receive processor coupled to the second memory device, the receiver processor configured to i) store packet data corresponding to packets received via one or more network interfaces to the second memory device, and ii) generate packet descriptors for packets received via network interfaces, wherein the packet data includes at least payloads of packets; and transmit processor coupled to the second memory device, the transmit processor configured to i) receive packet descriptors removed from the transmit queue by the queue controller, ii) retrieve packet data, corresponding to the received packet descriptors, from the second memory device, and iii) provide packets to the at least one network interface for transmission.

The first memory device includes a first read/write interface; the second memory device includes a second read/write interface separate from the first read/write interface; the receive processor is configured to store packet data corresponding to packets received via one or more network interfaces to the second memory device using the second read/write interface; the transmit processor is configured to retrieve packet data from the second memory device using the second read/write interface; and the queue controller is configured to: store new LL elements in the tail part to the first memory device using the first read/write interface, retrieve LL elements in the head part from the first memory device using the first read/write interface, retrieve LL elements in the middle part from the second memory device using the second read/write interface and store the retrieved LL elements from the middle part to the head part in the first memory device using the first read/write interface.

In still another embodiment, a method includes receiving packets via a plurality of network interfaces of a network device; determining, at the network device, network interfaces to which received packets are to be forwarded; and storing in a first memory device: (i) a head part of a first-in-first-out (FIFO) transmit queue corresponding to at least one of the network interfaces, the FIFO transmit queue for storing packet descriptors corresponding to packets to be transmitted via the at least one network interface, the FIFO transmit queue structured as a linked list (LL) of LL elements arranged in an order in which the LL elements were added to the FIFO queue, the head part including a first plurality of LL elements arranged for retrieval from the FIFO queue in the order in which the LL elements were added to the FIFO queue, and (ii) a tail part of the FIFO queue, the tail part comprising a second plurality of LL elements arranged corresponding to an order in which the second plurality LL elements were added to the FIFO queue. The method further includes: storing, in a second memory device that is separate from the first memory, a middle part of the FIFO queue, the middle part comprising a third plurality of LL elements following, in the order, the head part and preceding, in the order, the tail part; retrieving, from the first memory device, LL elements in the head part according to the order in connection with transmission, via the at least one network interface, of packets corresponding to packet descriptors in the transmit queue; moving, with a queue controller, LL elements in the middle part from the second memory device to the head part in the first memory device prior to the head part becoming empty; and updating, with the queue controller, LL parameters corresponding to the moved LL elements to indicate storage of the moved LL elements changing from the second memory device to the first memory device.

In other embodiments, the method comprises one of, or any suitable combination of two or more of, the following features.

Moving LL elements in the middle part from the second memory device to the head part in the first memory device is in response to determining, at the queue controller, that a number of LL elements in the head part fell below a threshold.

The method further comprises: moving, with the queue controller, LL elements in the tail part preceding, in the order, the new LL elements from the first memory device to the middle part in the second memory device; and updating, with the queue controller, LL parameters corresponding to the LL elements moved from the tail part to the middle part to indicate storage of the LL elements moved from the tail part to the middle part having changed from the first memory device to the second memory device.

The method further comprises: storing packet data corresponding to packets received via one or more network interfaces to the second memory device, wherein the packet data includes at least payloads of packets; generating, at the network device, packet descriptors for packets received via network interfaces; retrieving, from the second memory device, packet data corresponding to packet descriptors retrieved from the transmit queue; and providing packets to the at least one network interface for transmission.

The first memory device includes a first read/write interface; the second memory device includes a second read/write interface separate from the first read/write interface; storing packet data corresponding to packets received via one or more network interfaces to the second memory device comprises using the second read/write interface; retrieving packet data from the second memory device comprises using the second read/write interface; storing new LL elements in the tail part to the first memory device comprises using the first read/write interface; retrieving LL elements in the head part from the first memory device comprises using the first read/write interface; retrieving 'LL elements in the middle part from the second memory device comprises using the second read/write interface; and storing the retrieved LL elements from the middle part to the head part in the first memory device comprises using the first read/write interface.

In another embodiment, a network device comprises: a plurality of network interfaces configured to couple to a plurality of network links; a first memory device having a read/write interface; a receive processor coupled to the first memory device, the receiver processor configured to i) store packet data corresponding to packets received via one or more network interfaces to the first memory device using the read/write interface of the first memory device, and ii) generate packet descriptors for packets received via network interfaces, wherein the packet data includes at least payloads of packets; a packet processor configured to process packet descriptors to determine network interfaces via which packets are to be transmitted; and a packet descriptor cache unit coupled to the first memory device, the packet descriptor cache unit configured to: store packet descriptors in queues to the first memory device using the read/write interface of the first memory device, including storing multiple packet descriptors to the first memory in a single write operation, and retrieve packet descriptors in queues from the first memory device using the read/write interface of the first memory device, including retrieving multiple packet descriptors from the first memory device in a single read operation. The network device also comprises a transmit processor coupled to the first memory device, the transmit processor configured to i) receive packet descriptors removed from one or more queues by the packet descriptor cache unit, ii) retrieve packet data, corresponding to the received packet descriptors, from the first memory device using the read/write interface of the first memory device, and iii) provide packets to one or more network interfaces for transmission.

In other embodiments, the network device comprises one of, or any suitable combination of two or more of, the following features.

The network device further comprises: a second memory device having a read/write interface; the packet descriptor cache unit is coupled to the second memory device; and the packet descriptor cache unit is configured to enqueue and dequeue packet descriptors to the second memory device using the read/write interface of the second memory device.

The network device further comprises: a plurality of buffers; the packet descriptor cache unit is coupled to the plurality of buffers; and the packet descriptor cache unit is configured to: transfer a set of multiple packet descriptors corresponding to a first queue from the second memory device to a first buffer using the read/write interface of the second memory device, transfer the set of multiple packet descriptors from the first buffer to the first memory device using the read/write interface of the first memory device, transfer the set of multiple packet descriptors from the first memory device to the first buffer, or a second buffer, using the read/write interface of the first memory device, and transfer the set of multiple packet descriptors from the first buffer, or the second buffer, to the second memory device using the read/write interface of the second memory device.

The packet descriptor cache unit includes a controller configured to: maintain a plurality of linked lists corresponding to a plurality of queues, wherein heads and tails of the linked lists are stored in the second memory device; enqueue packet descriptors to queues by enqueuing packets descriptors to tails of linked lists; dequeue packet descriptors from queues by dequeuing packets descriptors from heads of linked lists; store packet descriptors in queues to the first memory device by transferring sets of multiple packet descriptors between heads and tails of queues from the second memory device to the first memory device; and retrieve packet descriptors in queues from the first memory device by transferring sets of multiple packet descriptors between heads and tails of queues from the first memory device to the second memory device.

The controller is configured to: maintain for at least one queue: i) a head part of the queue comprising multiple packet descriptors, ii) a tail part of the queue comprising multiple packet descriptors, and iii) a middle part of the queue comprising multiple packet descriptors; wherein packet descriptors corresponding to the at least one queue stored in the first memory device correspond to the middle part of the queue.

In yet another embodiment, a method includes: storing, in a first memory device, packet data using a read/write interface of the first memory device, the packet data corresponding to packets received via network interfaces of a network device, the packet data including at least payloads of packets; generating, at the network device, packet descriptors for packets received via the network interfaces; determining, at the network devices, network interfaces via which packets are to be transmitted by processing the packet descriptors; storing packet descriptors in queues to the first memory device using the read/write interface of the first memory device, including storing multiple packet descriptors to the first memory device in a single write operation; retrieving packet descriptors in queues from the first memory device using the read/write interface of the first memory device, including retrieving multiple packet descriptors from the first memory device in a single read operation; retrieving, responsive to packet descriptors dequeued from the queues, packet data from the first memory device using the read/write interface of the first memory device; and providing, at the network device, packets to one or more network interfaces for transmission.

In other embodiments, the method comprises one of, or any suitable combination of two or more of, the following features.

The method further includes: enqueuing packet descriptors to queues, including storing packets descriptors to a second memory device, separate from the first memory device, using a read/write interface of the second memory device; and dequeuing packet descriptors from queues, including retrieving packets descriptors from the second memory device using the read/write interface of the second memory device.

The method further includes: transferring a set of multiple packet descriptors corresponding to a first queue from the second memory device to a first buffer using the read/write interface of the second memory device; transferring the set of multiple packet descriptors from the first buffer to the first memory device using the read/write interface of the first memory device; transferring the set of multiple packet descriptors from the first memory device to the first buffer, or a second buffer, using the read/write interface of the first memory device; and transferring the set of multiple packet descriptors from the first buffer, or the second buffer, to the second memory device using the read/write interface of the second memory device.

The method further includes: maintaining, at the network device, a plurality of linked lists corresponding to a plurality of queues, wherein heads and tails of the linked lists are stored in the second memory device; enqueuing packet descriptors to queues by enqueuing packets descriptors to tails of linked lists;

dequeuing packet descriptors from queues by dequeuing packets descriptors from heads of linked lists; storing packet descriptors in queues to the first memory device by transferring sets of multiple packet descriptors between heads and tails of queues from the second memory device to the first memory device; and retrieving packet descriptors in queues from the first memory device by transferring sets of multiple packet descriptors between heads and tails of queues from the first memory device to the second memory device.

Maintaining the plurality of linked lists includes: maintaining for at least one queue: i) a head part of the queue comprising multiple packet descriptors, ii) a tail part of the queue comprising multiple packet descriptors, and iii) a middle part of the queue comprising multiple packet descriptors; and maintaining a head pointer and a tail pointer of the middle part that point to one or more memory locations in the first memory device.

In still another embodiment, an apparatus comprises: a first memory device; a second memory device; and a controller configured to: maintain a linked list having a head and a tail, store, in the first memory device, at least the head and the tail, add new data elements to the head of the linked list, including storing the new data elements to the first memory device, remove data elements from the tail of the linked list, including retrieving data elements from the first memory device, move data elements in the linked list between the head and tail from the first memory device to the second memory device, and move data elements in the linked list between the head and tail from the second memory device to the first memory device.

In other embodiments, the apparatus comprises one of, or any suitable combination of two or more of, the following features.

The controller is configured to: move data elements in the linked list between the head and tail from the first memory device to the second memory device in response to determining that a length of one of i) the linked list, or ii) a first part of the linked list, meets a first threshold.

The controller is configured to: move data elements in the linked list between the head and tail from the second memory device to the first memory device in response to determining that the length of one of i) the linked list, ii) the first part of the linked list, or iii) a second part of the linked list, no longer meets a second threshold.

The first threshold is different than the second threshold.

The controller is configured to: maintain a head part of the linked list, wherein the head part of the linked list comprises a first set of multiple data elements stored in the first memory, maintain a tail part of the linked list, wherein the tail part of the linked list comprises a second set of multiple data elements stored in the first memory, and maintain a middle part of the linked list, wherein the middle part of the linked list comprises a third set of multiple data elements stored in the second memory.

In another embodiment, a method includes: maintaining, with a controller, a linked list having a head and a tail; storing, in a first memory device, at least the head and the tail; adding, with the controller, new data elements to the head of the linked list, including storing the new data elements to the first memory device; removing, with the controller, data elements from the tail of the linked list, including retrieving data elements from the first memory device; moving, with the controller, data elements in the linked list between the head and tail from the first memory device to the second memory device; and moving, with the controller, data elements in the linked list between the head and tail from the second memory device to the first memory device.

In other embodiments, the method comprises one of, or any suitable combination of two or more of, the following features.

Moving data elements in the linked list between the head and tail from the first memory device to the second memory device is responsive to determining, at the controller, that a length of one of i) the linked list, or ii) a first part of the linked list, meets a first threshold.

Moving data elements in the linked list between the head and tail from the second memory device to the first memory device is responsive to determining, at the controller, that the length of one of i) the linked list, ii) the first part of the linked list, or iii) a second part of the linked list, no longer meets a second threshold.

The first threshold is different than the second threshold.

The method further includes: maintaining, with the controller, a head part of the linked list, wherein the head part of the linked list comprises a first set of multiple data elements stored in the first memory; maintaining, with the controller, a tail part of the linked list, wherein the tail part of the linked list comprises a second set of multiple data elements stored in the first memory; and maintaining, with the controller, a middle part of the linked list, wherein the middle part of the linked list comprises a third set of multiple data elements stored in the second memory.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. The software or firmware instructions may include machine readable instructions that, when executed by one or more processors, cause the one or more processors to perform various acts.

When implemented in hardware, the hardware may comprise one or more of discrete components, an integrated circuit, an application-specific integrated circuit (ASIC), a programmable logic device (PLD), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. An apparatus, comprising:
    a first memory device configured to store:
        (i) a head part of a first-in-first-out (FIFO) queue, the FIFO queue structured as a linked list (LL) of LL elements arranged in an order in which the LL elements were added to the FIFO queue, the head part including a first plurality of LL elements arranged for retrieval from the FIFO queue in the order in which the LL elements were added to the FIFO queue, and
        (ii) a tail part of the FIFO queue, the tail part comprising a second plurality of LL elements arranged corresponding to an order in which the second plurality LL elements were added to the FIFO queue;
a second memory device that is separate from the first memory, the second memory configured to store a middle part of the FIFO queue, the middle part comprising a third plurality of LL elements following, in the order, the head part and preceding, in the order, the tail part; and
a queue controller configured to:
retrieve LL elements in the head part from the first memory device according to the order,
move LL elements in the middle part from the second memory device to the head part in the first memory device prior to the head part becoming empty, and
update LL parameters corresponding to the moved LL elements to indicate storage of the moved LL elements changing from the second memory device to the first memory device.

2. The apparatus of claim 1, wherein the queue controller is further configured to:
move LL elements in the middle part from the second memory device to the head part in the first memory device in response to a number of LL elements in the head part falling below a threshold.

3. The apparatus of claim 1, wherein:
the LL parameters include pointers to memory locations at which LL elements are stored; and
the queue controller is configured to update pointers corresponding to the LL elements moved from the middle part to the head part to point to locations in the first memory.

4. The apparatus of claim 1, wherein the queue controller is further configured to:
store new LL elements to the tail part in the first memory device,
update LL parameters corresponding to the tail part to reflect addition of the new LL elements to the linked list,
move LL elements in the tail part preceding, in the order, the new LL elements from the first memory device to the middle part in the second memory device, and
update LL parameters corresponding to the LL elements moved from the tail part to the middle part to indicate storage of the LL elements moved from the tail part to the middle part having changed from the first memory device to the second memory device.

5. The apparatus of claim 4, wherein the queue controller is further configured to:
move LL elements in the tail part preceding, in the order, the new LL elements from the first memory device to the middle part in the second memory device in response to one of i) a number of LL elements in the tail part meeting a first threshold, and ii) a number of LL elements in the LL meeting a second threshold.

6. The apparatus of claim 1, wherein:
the LL parameters include pointers to memory locations at which LL elements are stored; and
the queue controller is configured to update one or more pointers corresponding to the LL elements moved from the tail part to the middle part to point to one or more locations in the second memory.

7. The apparatus of claim 1, wherein the queue controller is further configured to:
update LL parameters corresponding to the head part to reflect removal of the LL elements from the linked list in connection with the retrieval of LL elements in the head part from the first memory device according to the order.

8. A method, comprising:
storing in a first memory device:
(i) a head part of a first-in-first-out (FIFO) queue, the FIFO queue structured as a linked list (LL) of LL elements arranged in an order in which the LL elements were added to the FIFO queue, the head part including a first plurality of LL elements arranged for retrieval from the FIFO queue in the order in which the LL elements were added to the FIFO queue, and
(ii) a tail part of the FIFO queue, the tail part comprising a second plurality of LL elements arranged corresponding to an order in which the second plurality LL elements were added to the FIFO queue;
storing, in a second memory device that is separate from the first memory, a middle part of the FIFO queue, the middle part comprising a third plurality of LL elements following, in the order, the head part and preceding, in the order, the tail part;
retrieving, from the first memory device, LL elements in the head part according to the order;
moving, with a queue controller, LL elements in the middle part from the second memory device to the head part in the first memory device prior to the head part becoming empty; and
updating, with the queue controller, LL parameters corresponding to the moved LL elements to indicate storage of the moved LL elements changing from the second memory device to the first memory device.

9. The method of claim 8, wherein moving LL elements in the middle part from the second memory device to the head part in the first memory device is in response to determining, at the queue controller, that a number of LL elements in the head part fell below a threshold.

10. The method of claim 8, wherein:
the LL parameters include pointers to memory locations at which LL elements are stored; and
the method further comprises updating, with the queue controller, pointers corresponding to the LL elements moved from the middle part to the head part to point to locations in the first memory.

11. The method of claim 8, further comprising:
storing, in the first memory device, new LL elements to the tail part;
updating, with the queue controller, LL parameters corresponding to the tail part to reflect addition of the new LL elements to the linked list;
moving, with the queue controller, LL elements in the tail part preceding, in the order, the new LL elements from the first memory device to the middle part in the second memory device; and
updating, with the queue controller, LL parameters corresponding to the LL elements moved from the tail part to the middle part to indicate storage of the LL elements moved from the tail part to the middle part having changed from the first memory device to the second memory device.

12. The method of claim 11, further comprising:
moving, with the queue controller, LL elements in the tail part preceding, in the order, the new LL elements from the first memory device to the middle part in the second memory device in response to one of i) a number of LL elements in the tail part meeting a first threshold, and
ii) a number of LL elements in the LL meeting a second threshold.

13. The method of claim 8, wherein:
the LL parameters include pointers to memory locations at which LL elements are stored; and
the method further comprises updating, with the queue controller, one or more pointers corresponding to the LL elements moved from the tail part to the middle part to point to one or more locations in the second memory.

14. An apparatus, comprising:
a plurality of network interfaces configured to couple to a plurality of network links;
a packet processor configured to process packets received via the plurality of network interfaces and to determine network interfaces to which received packets are to be forwarded;
a first memory device configured to store:
   (i) a head part of a first-in-first-out (FIFO) transmit queue corresponding to at least one of the network interfaces, the FIFO transmit queue for storing packet descriptors corresponding to packets to be transmitted via the at least one network interface, the FIFO transmit queue structured as a linked list (LL) of LL elements arranged in an order in which the LL elements were added to the FIFO queue, the head part including a first plurality of LL elements arranged for retrieval from the FIFO queue in the order in which the LL elements were added to the FIFO queue, and
   (ii) a tail part of the FIFO queue, the tail part comprising a second plurality of LL elements arranged corresponding to an order in which the second plurality LL elements were added to the FIFO queue;
a second memory device that is separate from the first memory, the second memory configured to store a middle part of the FIFO queue, the middle part comprising a third plurality of LL elements following, in the order, the head part and preceding, in the order, the tail part; and
a queue controller configured to:
   store new LL elements in the tail part to the first memory device according to the order in connection with new packet descriptors being added to the transmit queue,
   retrieve LL elements in the head part from the first memory device according to the order in connection with transmission, via the at least one network interface, of packets corresponding to packet descriptors in the transmit queue,
   move LL elements in the middle part from the second memory device to the head part in the first memory device prior to the head part becoming empty, and
   update LL parameters corresponding to the moved LL elements to indicate storage of the moved LL elements changing from the second memory device to the first memory device.

15. The apparatus of claim 14, wherein the queue controller is further configured to:
move LL elements in the middle part from the second memory device to the head part in the first memory device in response to a number of LL elements in the head part falling below a threshold.

16. The apparatus of claim 14, wherein the queue controller is further configured to:

move LL elements in the tail part preceding, in the order, the new LL elements from the first memory device to the middle part in the second memory device, and
update LL parameters corresponding to the LL elements moved from the tail part to the middle part to indicate storage of the LL elements moved from the tail part to the middle part having changed from the first memory device to the second memory device.

17. The apparatus of claim 14, further comprising:
a receive processor coupled to the second memory device, the receiver processor configured to i) store packet data corresponding to packets received via one or more network interfaces to the second memory device, and ii) generate packet descriptors for packets received via network interfaces, wherein the packet data includes at least payloads of packets; and
a transmit processor coupled to the second memory device, the transmit processor configured to i) receive packet descriptors removed from the transmit queue by the queue controller, ii) retrieve packet data, corresponding to the received packet descriptors, from the second memory device, and iii) provide packets to the at least one network interface for transmission.

18. The apparatus of claim 17, wherein:
the first memory device includes a first read/write interface;
the second memory device includes a second read/write interface separate from the first read/write interface;
the receive processor is configured to store packet data corresponding to packets received via one or more network interfaces to the second memory device using the second read/write interface;
the transmit processor is configured to retrieve packet data from the second memory device using the second read/write interface; and
the queue controller is configured to:
   store new LL elements in the tail part to the first memory device using the first read/write interface,
   retrieve LL elements in the head part from the first memory device using the first read/write interface,
   retrieve LL elements in the middle part from the second memory device using the second read/write interface and store the retrieved LL elements from the middle part to the head part in the first memory device using the first read/write interface.

19. A method, comprising:
receiving packets via a plurality of network interfaces of a network device;
determining, at the network device, network interfaces to which received packets are to be forwarded;
storing in a first memory device:
   (i) a head part of a first-in-first-out (FIFO) transmit queue corresponding to at least one of the network interfaces, the FIFO transmit queue for storing packet descriptors corresponding to packets to be transmitted via the at least one network interface, the FIFO transmit queue structured as a linked list (LL) of LL elements arranged in an order in which the LL elements were added to the FIFO queue, the head part including a first plurality of LL elements arranged for retrieval from the FIFO queue in the order in which the LL elements were added to the FIFO queue, and
   (ii) a tail part of the FIFO queue, the tail part comprising a second plurality of LL elements arranged corresponding to an order in which the second plurality LL elements were added to the FIFO queue;

storing, in a second memory device that is separate from the first memory, a middle part of the FIFO queue, the middle part comprising a third plurality of LL elements following, in the order, the head part and preceding, in the order, the tail part; and retrieving, from the first memory device, LL elements in the head part according to the order in connection with transmission, via the at least one network interface, of packets corresponding to packet descriptors in the transmit queue;

moving, with a queue controller, LL elements in the middle part from the second memory device to the head part in the first memory device prior to the head part becoming empty; and updating, with the queue controller, LL parameters corresponding to the moved LL elements to indicate storage of the moved LL elements changing from the second memory device to the first memory device.

20. The method of claim 19, wherein moving LL elements in the middle part from the second memory device to the head part in the first memory device is in response to determining, at the queue controller, that a number of LL elements in the head part fell below a threshold.

21. The method of claim 19, further comprising:
moving, with the queue controller, LL elements in the tail part preceding, in the order, the new LL elements from the first memory device to the middle part in the second memory device; and updating, with the queue controller, LL parameters corresponding to the LL elements moved from the tail part to the middle part to indicate storage of the LL elements moved from the tail part to the middle part having changed from the first memory device to the second memory device.

22. The method of claim 19, further comprising:
storing packet data corresponding to packets received via one or more network interfaces to the second memory device, wherein the packet data includes at least payloads of packets;

generating, at the network device, packet descriptors for packets received via network interfaces;

retrieving, from the second memory device, packet data corresponding to packet descriptors retrieved from the transmit queue; and providing packets to the at least one network interface for transmission.

23. The method of claim 22, wherein:
the first memory device includes a first read/write interface;

the second memory device includes a second read/write interface separate from the first read/write interface;

storing packet data corresponding to packets received via one or more network interfaces to the second memory device comprises using the second read/write interface;

retrieving packet data from the second memory device comprises using the second read/write interface;

storing new LL elements in the tail part to the first memory device comprises using the first read/write interface;

retrieving LL elements in the head part from the first memory device comprises using the first read/write interface;

retrieving LL elements in the middle part from the second memory device comprises using the second read/write interface; and storing the retrieved LL elements from the middle part to the head part in the first memory device comprises using the first read/write interface.

* * * * *